(12) United States Patent
Wu et al.

(10) Patent No.: US 10,586,061 B2
(45) Date of Patent: Mar. 10, 2020

(54) FEDERATED SEARCH

(71) Applicant: Oracle International Corporation, Redwood Shores, CA (US)

(72) Inventors: Jing Wu, Foster City, CA (US); Blake Sullivan, Redwood City, CA (US); Michael William McGrath, San Ramon, CA (US); Min Lu, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 332 days.

(21) Appl. No.: 15/331,626

(22) Filed: Oct. 21, 2016

(65) Prior Publication Data

US 2017/0116343 A1    Apr. 27, 2017

Related U.S. Application Data

(60) Provisional application No. 62/245,574, filed on Oct. 23, 2015.

(51) Int. Cl.
| | |
|---|---|
| *G06F 21/62* | (2013.01) |
| *H04L 29/08* | (2006.01) |
| *G06F 21/60* | (2013.01) |
| *G06F 16/25* | (2019.01) |

(52) U.S. Cl.
CPC ........ *G06F 21/6209* (2013.01); *G06F 16/256* (2019.01); *G06F 21/602* (2013.01); *G06F 21/6227* (2013.01); *H04L 67/10* (2013.01)

(58) Field of Classification Search
CPC .................................................. G06F 21/629
See application file for complete search history.

(56) References Cited

U.S. PATENT DOCUMENTS

| | | |
|---|---|---|
| 8,745,413 B2 | 6/2014 | Hahn et al. |
| 9,021,135 B2 | 4/2015 | Ang et al. |
| 9,053,344 B2 | 6/2015 | Arasaratnam et al. |

(Continued)

FOREIGN PATENT DOCUMENTS

| | | |
|---|---|---|
| WO | 2017070575 | 4/2017 |
| WO | 2017070599 | 4/2017 |

OTHER PUBLICATIONS

International Application No. PCT/US2016/058295, International Search Report and Written Opinion dated Mar. 22, 2017, 16 pages.

(Continued)

*Primary Examiner* — Van H Oberly
(74) *Attorney, Agent, or Firm* — Kilpatrick Townsend & Stockton LLP

(57) ABSTRACT

Systems and methods are provided for federated search. Search results can be federated across cloud-based data stores having data accessible to applications hosted in the cloud and private data stores protected by a data security provider that manages communications between a private network and the cloud. A search query invoked by a client of a cloud-based application can be partitioned into search criteria applicable to the cloud-based data stores and search criteria applicable to the private data store. The cloud-based application can perform a search using the search criteria applicable to the cloud-based data stores and use results of a search against the private data store to federate the results.

20 Claims, 13 Drawing Sheets

(56) References Cited

U.S. PATENT DOCUMENTS

| | | | |
|---|---|---|---|
| 9,116,888 | B1 | 8/2015 | Wang et al. |
| 9,369,443 | B1 | 6/2016 | Sinor |
| 9,413,526 | B1* | 8/2016 | Kothari .................... H04L 9/08 |
| 9,762,603 | B2 | 9/2017 | Grondin et al. |
| 2008/0208918 | A1 | 8/2008 | Yang et al. |
| 2009/0094193 | A1 | 4/2009 | King et al. |
| 2012/0278504 | A1 | 11/2012 | Ang et al. |
| 2012/0278621 | A1 | 11/2012 | Woloszyn |
| 2013/0054650 | A1 | 2/2013 | O'Byrne |
| 2013/0205028 | A1 | 8/2013 | Crockett et al. |
| 2013/0312109 | A1 | 11/2013 | Arasaratnam et al. |
| 2015/0237021 | A1* | 8/2015 | Sovio .................... H04L 9/083 |
| | | | 713/168 |
| 2015/0379303 | A1 | 12/2015 | Lafever et al. |
| 2017/0041296 | A1* | 2/2017 | Ford .................... G06F 16/951 |
| 2017/0116428 | A1 | 4/2017 | Wu et al. |
| 2017/0116436 | A1 | 4/2017 | Wu et al. |
| 2017/0118268 | A1 | 4/2017 | Wu et al. |
| 2018/0150647 | A1 | 5/2018 | Naqvi et al. |

OTHER PUBLICATIONS

"International Preliminary Report on Patentability" issued in PCT/US2016/058270, dated May 3, 2018, 8 pages.

"International Preliminary Report on Patentability" issued in PCT/US2016/058295, dated May 3, 2018, 11 pages.

Rich et al., "Understanding and Selecting a Tokenization Solution, Securosis," L.L.C, retrieved from the Internet: URL:https://securosis.com/assets/library/reports/Securosis Understanding_Tokenization_V.1.0.pdf, Jan. 1, 2010, pp. 1-33.

International Application No. PCT/US2016/058270, International Search Report and Written Opinion dated Jan. 18, 2017, 11 pages.

International Application No. PCT/US2016/058295, Invitation to Pay Add'l Fees and Partial Search Report dated Jan. 25, 2017, 5 pages.

"Non-Final Office Action" issued in U.S. Appl. No. 15/331,448, dated Jun. 28, 2018, 7 pages.

"Notice of Allowance", issued in U.S. Appl. No. 15/331,448, dated Oct. 11, 2018, 8 pages.

"Non Final Office Action", issued in U.S. Appl. No. 15/331,465, dated Aug. 27, 2018, 9 pages.

"Non-Final Office Action", issued in U.S. Appl. No. 15/331,672, dated Nov. 30, 2018, 12 pages.

U.S. Appl. No. 15/331,465, Advisory Action dated May 30, 2019, 5 pages.

U.S. Appl. No. 15/331,672, Final Office Action dated May 16, 2019, 10 pages.

U.S. Appl. No. 15/331,465 , "Final Office Action" dated Feb. 13, 2019, 10 pages.

U.S. Appl. No. 15/331,465, Notice of Allowance dated Sep. 11, 2019, 7 pages.

U.S. Appl. No. 15/331,672, Advisory Action dated Sep. 19, 2019, 4 pages.

\* cited by examiner

FEDERATED SEARCH

CROSS-REFERENCES TO RELATED APPLICATIONS

The present application is a non-provisional application of, and claims the benefit and priority under 35 U.S.C. 119(e) of U.S. Provisional Application No. 62/245,574, filed Oct. 23, 2015, entitled "FEDERATED SEARCH," the entire contents of which are incorporated herein by reference for all purposes.

BACKGROUND OF THE INVENTION

There is a complex web of regulations and policies that govern data privacy. The most frequently cited are the Health Insurance Portability and Accountability Act (HIPAA), and the Payment Card Industry Data Security Standard (PCI DSS). European data protection laws often go even further, prohibiting any personally identifiable information from moving outside EU or country borders. This puts some obvious limits on unrestrained use of the public cloud. Organizations are also concerned that law enforcement or government officials could potentially access data directly from their cloud service provider, bypassing the company completely.

For example, European data protection laws prohibit personal data that can be linked to a specific person from moving outside of European Union (EU) or even specific country borders. Such laws can prohibit organizations from storing or processing data in the cloud because infrastructure providers may store, process or back up data in multiple global locations. In the U.S., regulations such as the Health Insurance Portability and Accountability Act (HIPAA) require maintaining security and privacy around personal health information (PHI). The complexity of doing so may dissuade healthcare providers from using cost-effective public cloud-based solutions that could slow the rising cost of healthcare.

One way to get around the issues of data security, residency, and privacy is to obfuscate the data that goes into the cloud. Two common methods of obfuscation are encryption and tokenization. Using either of these approaches ensures that data remains undecipherable to prying eyes while the organization enjoys the benefits of cloud-based applications. Encryption uses algorithmic schemes to transform plain text information into a non-readable cipher text. A key (or algorithm) is required to decrypt the information and return it to its original plain text format. Tokenization is an increasingly popular approach for the protection of sensitive data. It involves the use of data substitution with a token (or alias) as a replacement for the real values. Unlike encryption, which uses a mathematical process to transform data, tokenization uses random characters to substitute for the actual data. There is no "key" that can decipher the token and turn it back into real data.

In the process of tokenization, the sensitive data is sent to a centralized and highly secure server called a "vault" where it is stored securely. At the same time, a random unique set of characters (the token) is generated and returned for use in place of the real data. The vault manager maintains a reference database that allows the token value to be exchanged for the real data when it is needed again. Meanwhile the token value, which has no meaning whatsoever to prying eyes, can be used in various cloud-based applications as a reliable substitute for the real data.

Merchants often use tokenized data as a substitute for sensitive credit card information after a sale has concluded. This allows a merchant to perform sales analytics on customers' transactions without putting the real card data at risk. What's more, PCI prohibits the use of live card data for anything other than the payment transaction. By tokenizing post-transaction data, merchants can reduce their PCI burden because no sensitive data exists in their backend systems.

The same methods can be applied for other types of sensitive data, including patient records, customer account records, human resources information and so on. Tokenizing the real data takes it out of harm's way and addresses the requirements for security, residency, and privacy. Tokenized data can be stored and used anywhere—even in the cloud—because it cannot be turned back into the real data if lost or stolen.

BRIEF SUMMARY OF THE INVENTION

The following portion of this disclosure presents a simplified summary of one or more innovations, embodiments, and/or examples found within this disclosure for at least the purpose of providing a basic understanding of the subject matter. This summary does not attempt to provide an extensive overview of any particular embodiment or example. Additionally, this summary is not intended to identify key/critical elements of an embodiment or example or to delineate the scope of the subject matter of this disclosure. Accordingly, one purpose of this summary may be to present some innovations, embodiments, and/or examples found within this disclosure in a simplified form as a prelude to a more detailed description presented later.

In exemplary embodiments, a method to be performed by a computing device is provided. The method includes receiving first search criteria from a search initiated by a client device against data of a cloud-based application being used by a user of the client device. The first search criterion is determined to apply to a portion of the data of the cloud-based application unprotected by a data security provider monitoring communications of the client device. The method further includes receiving first search results based on performing a first search against the data of the cloud-based application using the first search criteria, receiving second search results based on performing a second search against data of the data security provider using second search criteria, federating the first search results and the second search results into a third search result, and communicating the third search results to the client device.

In some embodiments, receiving the second search results based on performing the second search against the data of the data security provider comprises receiving information identifying replacement data used by the data security provider in the data of the cloud-based application. Optionally, receiving the second search results based on performing the second search against the data of the data security provider comprises receiving a set of row keys identifying one or more rows in the data of the cloud-based application. Optionally, federating the first search results and the second search results into the third search result comprises filtering the first search results using the second search results. Optionally, federating the first search results and the second search results into the third search result comprises merging the first search results and the second search results.

In some embodiments, communicating the third search results to the client device comprises communicating one or more tokens in the data of the cloud-based application representing data stored by the data security provider that satisfies the second search criteria. Optionally, communicating the third search results to the client device comprises communicating one or more encrypted data in the data of the cloud-based application representing data stored by the data security provider that satisfies the second search criteria.

In exemplary embodiments, a non-transitory machine readable storage medium is provided for having instructions stored thereon that when executed by one or more processors cause the one or more processors to perform a method. The method includes receiving first search criteria from a search initiated by a client device against data of a cloud-based application being used by a user of the client device. The first search criterion is determined to apply to a portion of the data of the cloud-based application unprotected by a data security provider monitoring communications of the client device. The method further includes receiving first search results based on performing a first search against the data of the cloud-based application using the first search criteria, receiving second search results based on performing a second search against data of the data security provider using second search criteria, federating the first search results and the second search results into a third search result, and communicating the third search results to the client device.

In some embodiments, receiving the second search results based on performing the second search against the data of the data security provider comprises receiving information identifying replacement data used by the data security provider in the data of the cloud-based application. Optionally, receiving the second search results based on performing the second search against the data of the data security provider comprises receiving a set of row keys identifying one or more rows in the data of the cloud-based application. Optionally, federating the first search results and the second search results into the third search result comprises filtering the first search results using the second search results. Optionally, federating the first search results and the second search results into the third search result comprises merging the first search results and the second search results.

In some embodiments, communicating the third search results to the client device comprises communicating one or more tokens in the data of the cloud-based application representing data stored by the data security provider that satisfies the second search criteria. Optionally, communicating the third search results to the client device comprises communicating one or more encrypted data in the data of the cloud-based application representing data stored by the data security provider that satisfies the second search criteria.

In exemplary embodiments, a system id provide for that includes a processor and a memory storing a set of instructions which when executed by the processor cause the processor to perform a method. The method includes receiving first search criteria from a search initiated by a client device against data of a cloud-based application being used by a user of the client device. The first search criterion is determined to apply to a portion of the data of the cloud-based application unprotected by a data security provider monitoring communications of the client device. The method further includes receiving first search results based on performing a first search against the data of the cloud-based application using the first search criteria, receiving second search results based on performing a second search against data of the data security provider using second search criteria, federating the first search results and the second search results into a third search result, and communicating the third search results to the client device.

In some embodiments, receiving the second search results based on performing the second search against the data of the data security provider comprises receiving information identifying replacement data used by the data security provider in the data of the cloud-based application. Optionally, receiving the second search results based on performing the second search against the data of the data security provider comprises receiving a set of row keys identifying one or more rows in the data of the cloud-based application. Optionally, federating the first search results and the second search results into the third search result comprises filtering the first search results using the second search results. Optionally, federating the first search results and the second search results into the third search result comprises merging the first search results and the second search results.

In some embodiments, communicating the third search results to the client device comprises communicating one or more tokens in the data of the cloud-based application representing data stored by the data security provider that satisfies the second search criteria. Optionally, communicating the third search results to the client device comprises communicating one or more encrypted data in the data of the cloud-based application representing data stored by the data security provider that satisfies the second search criteria.

A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or examples, or the presently understood best mode of any innovations presented within this disclosure.

DETAILED DESCRIPTION OF THE INVENTION

I. Introduction

Figure 1:
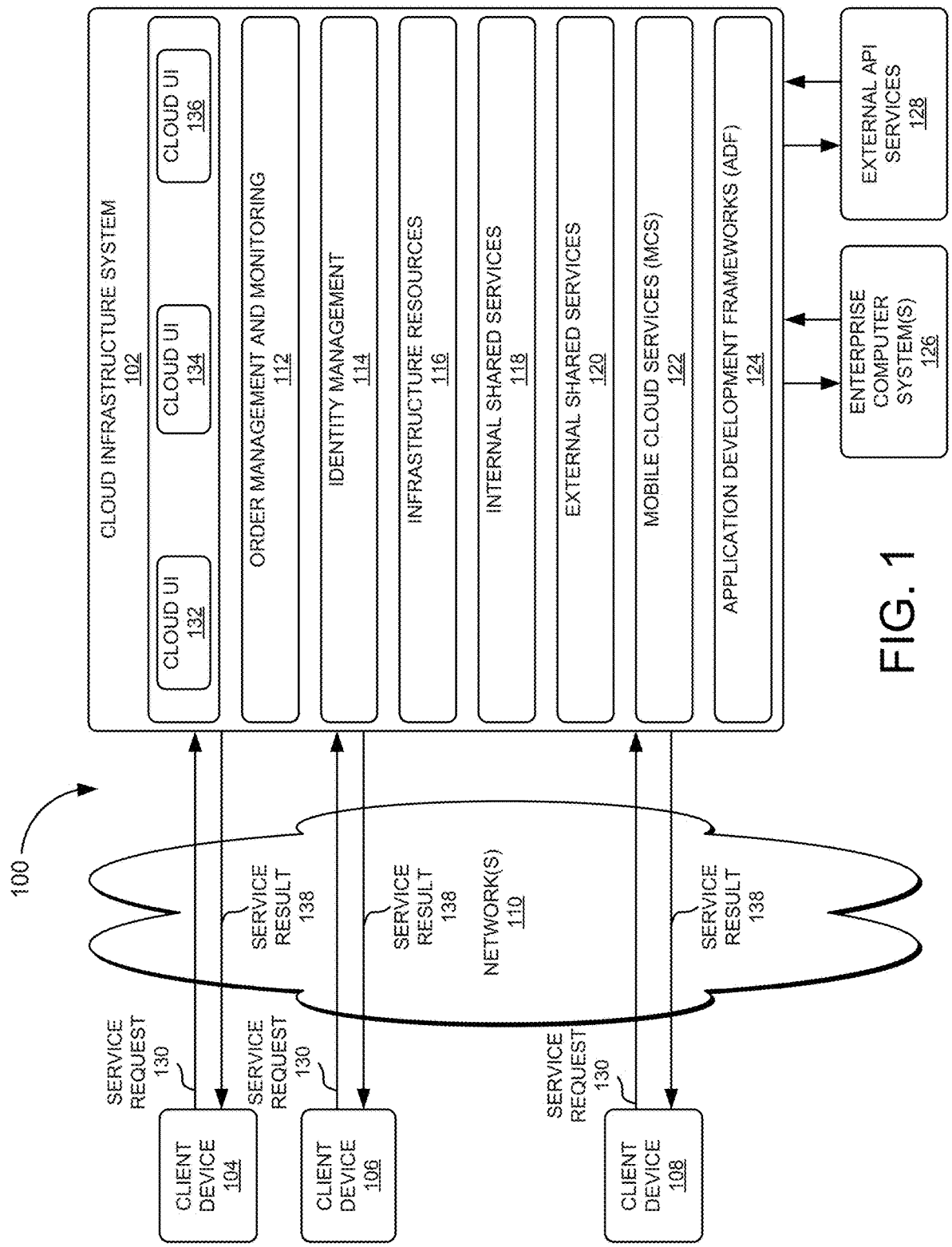
FIG. 1 is a block diagram of a system environment for developing cloud-based applications in one embodiment according to the present invention.

In the following description, for the purposes of explanation, specific details are set forth in order to provide a thorough understanding of embodiments of the invention. However, it will be apparent that various embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments. The figures and description are not intended to be restrictive. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" or "computer-readable medium" includes, but is not limited to, portable or non-portable storage devices, optical storage devices, wireless channels, and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable or computer-readable medium. One or more processors may perform the necessary tasks.

Systems depicted in some of the figures may be provided in various configurations. In some embodiments, the systems may be configured as a distributed system where one or more components of the system are distributed across one or more networks in a cloud computing system. In further embodiments, the systems may be configured as a single system where one or more components of the system incorporated into a single structure or package.

II. Cloud-Based Application Development

An application refers to a software program, which on execution performs specific desired tasks. In general, several applications are executed in a run-time environment containing one or more operating systems ("OSs"), virtual machines (e.g., supporting Java™ programming language), device drivers, etc. Developers often use Application Development Frameworks ("ADFs") (which are by themselves applications) for implementing/developing desired applications. An ADF provides a set of pre-defined code/data modules that can be directly/indirectly used in the development of an application. An ADF may also provide tools such as an integrated development environment ("IDE"), code generators, debuggers, etc. In general, an ADF simplifies application development by providing re-usable components which can be used by application developers to define user interfaces ("UIs") and application logic by, for example, selecting components to perform desired tasks and defining the appearance, behavior, and interactions of the selected components. Some ADFs, such as "Oracle ADF" from Oracle Corp., are based on a model-view-controller ("MVC") design pattern that promotes loose coupling and easier application development and maintenance.

FIG. 1 is a block diagram of a system environment 100 for developing cloud-based applications in one embodiment according to the present invention. In the illustrated embodiment, system environment 100 includes cloud infrastructure system 102 that provides cloud services to one or more client computing devices 104, 106, and 108. Client computing devices 104, 106, and 108 may be used by users to interact with cloud infrastructure system 102. Client computing devices 104, 106, and 108 may be configured to operate a client application such as a Web browser, a proprietary client application (e.g., Oracle Forms), or some other application, which may be used by a user of the client computing device to interact with cloud infrastructure system 102 to use services provided by cloud infrastructure system 102.

Cloud infrastructure system 102 may have other components than those depicted. Further, the embodiment shown in FIG. 1 is only one example of a cloud infrastructure system that may incorporate an embodiment of the invention. In some other embodiments, cloud infrastructure system 102 may have more or fewer components than shown in FIG. 1, may combine two or more components, or may have a different configuration or arrangement of components.

Client computing devices 104, 106, and 108 may be portable handheld devices (e.g., an iPhone®, cellular telephone, an iPad®, computing tablet, a personal digital assistant ("PDA")) or wearable devices (e.g., a Google Glass® head mounted display), running software such as Microsoft Windows Mobile®, and/or a variety of mobile OSs such as iOS, Windows Phone, Android, BlackBerry 10, Palm OS, and the like, and being Internet, e-mail, short message service ("SMS"), Blackberry®, or other communication protocol enabled. Client computing devices 104, 106, and 108 can be general-purpose personal computers including, by way of example, personal computers and/or laptop computers running various versions of Microsoft Windows®, Apple Macintosh®, and/or Linux OSs. Client computing devices 104, 106, and 108 can be workstation computers running any of a variety of commercially available UNIX® or UNIX-like OSs, including without limitation the variety of GNU/Linux OSs, such as for example, Google Chrome OS. Alternatively, or in addition, client computing devices 104, 106, and 108 may be any other electronic device, such as a thin-client computer, an Internet-enabled gaming system (e.g., a Microsoft Xbox gaming console with or without a Kinect® gesture input device), and/or a personal messaging device, capable of communicating over network(s) 110.

Although exemplary system environment 100 is shown with three client computing devices, any number of client computing devices may be supported. Other devices such as devices with sensors, etc., may interact with cloud infrastructure system 102.

Network(s) 110 may facilitate communications and exchange of data between clients 104, 106, and 108 and cloud infrastructure system 102. Network(s) 110 may be any type of network familiar to those skilled in the art that can support data communications using any of a variety of commercially-available protocols, including without limitation transmission control protocol/Internet protocol ("TCP/IP"), systems network architecture ("SNA"), Internet packet exchange ("IPX"), AppleTalk, etc. Merely by way of example, network(s) 110 can be a local area network ("LAN"), such as one based on Ethernet, Token-Ring and/or the like. Network(s) 110 can be a wide-area network and the Internet. It can include a virtual network, including without limitation a virtual private network ("VPN"), an intranet, an extranet, a public switched telephone network ("PSTN"), an infra-red network, a wireless network (e.g., a network operating under any of the Institute of Electrical and Electronics ("IEEE") 802.11 suite of protocols, Bluetooth®, and/or any other wireless protocol); and/or any combination of these and/or other networks.

Cloud infrastructure system 102 may comprise one or more computers and/or servers. These computer systems or servers may be composed of one or more general purpose computers, specialized server computers (including, by way of example, personal computer ("PC") servers, UNIX® servers, mid-range servers, mainframe computers, rack-mounted servers, etc.), server farms, server clusters, or any other appropriate arrangement and/or combination. In various embodiments, one or more computer systems or servers associated with cloud infrastructure system 102 may be adapted to run one or more services or software applications described in the foregoing disclosure. For example, one or more computer systems or servers associated with cloud infrastructure system 102 may correspond to a server for performing processing described herein according to an embodiment of the present disclosure.

One or more computer systems or servers associated with cloud infrastructure system 102 may run an OS including any of those discussed above, as well as any commercially available server OS. One or more computer systems or servers associated with cloud infrastructure system 102 may also run any of a variety of additional server applications and/or mid-tier applications, including hypertext transport protocol ("HTTP") servers, file transfer protocol ("FTP") servers, common gateway interface ("CGI") servers, JAVA® servers, database servers, and the like.

In certain embodiments, services provided by cloud infrastructure system 102 may include a host of services that are made available to users of cloud infrastructure system 102 on demand, such as online data storage and backup solutions, Web-based e-mail services, hosted office suites and document collaboration services, database processing, managed technical support services, and the like. Services provided by cloud infrastructure system 102 can dynamically scale to meet the needs of its users. A specific instantiation of a service provided by cloud infrastructure system 102 is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service instance instantiated by cloud infrastructure 102 may include protected computer network access to storage, a hosted database, a hosted Web server, a software application, or other service provided by a cloud vendor to a user, or as otherwise known in the art. For example, a service instance instantiated by cloud infrastructure 102 can include password-protected access to remote storage on the cloud through the Internet. As another example, a service instance instantiated by cloud infrastructure 102 can include a Web service-based hosted relational database and a script-language middleware engine for private use by a networked developer. As another example, a service instance instantiated by cloud infrastructure 102 can include access to an email software application hosted on a cloud vendor's Web site.

In certain embodiments, cloud infrastructure system 102 may include a suite of applications, middleware, development service, and database service offerings that are delivered to a customer in a self-service, subscription-based, elastically scalable, reliable, highly available, and secure manner. An example of such a cloud infrastructure system as embodied in cloud infrastructure service 102 is "Oracle Public Cloud" from Oracle Corp.

Cloud infrastructure system 102 may provide the cloud services via different deployment models. For example, services may be provided under a public cloud model in which cloud infrastructure system 102 is owned by an organization selling cloud services (e.g., owned by Oracle Corp.) and the services are made available to the general public or different industry enterprises. As another example, services may be provided under a private cloud model in which cloud infrastructure system 102 is operated solely for a single organization and may provide services for one or more entities within the organization. The cloud services may also be provided under a community cloud model in which cloud infrastructure system 102 and the services provided by cloud infrastructure system 102 are shared by several organizations in a related community. The cloud services may also be provided under a hybrid cloud model, which is a combination of two or more different models.

In some embodiments, the services provided by cloud infrastructure system 102 may include one or more services provided under software as a service ("SaaS") category, platform as a service ("PaaS") category, infrastructure as a service ("IaaS") category, MBaaS category, or other categories of services including hybrid services. In some embodiments, the services provided by cloud infrastructure system 102 may include, without limitation, application services, platform services, infrastructure services, backend services, etc. In some examples, application services may be provided by cloud infrastructure system 102 via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 102 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 102 without the need for customers to purchase separate licenses and support. Examples of platform services include, without limitation, "Oracle Java Cloud Service" ("JCS") from Oracle Corp., "Oracle Database Cloud Service" ("DBCS") from Oracle Corp., and others.

By utilizing the services provided by the PaaS platform, customers can employ programming languages and tools supported by cloud infrastructure system 102 and also control the deployed services. In some embodiments, platform services provided by cloud infrastructure system 102 may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in cloud infrastructure system 102. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 102 may provide comprehensive management of cloud services (e.g., SaaS, PaaS, IaaS, and MBaaS services) in the cloud infrastructure system. In one embodiment, cloud management functionality may include capabilities for provisioning, managing, and tracking a customer's subscription received by cloud infrastructure system 102, and the like. In various embodiments, cloud infrastructure system 102 may be adapted to automatically provision, manage, and track a customer's subscription to services offered by cloud infrastructure system 102. A customer, via a subscription order, may order one or more services provided by cloud infrastructure system 102. Cloud infrastructure system 102 then performs processing to provide the services in the customer's subscription order.

In one embodiment, cloud management functionality may be provided by one or more modules, such as order management and monitoring module 114. These modules may include or be provided using one or more computers and/or servers, which may be general purpose computers, specialized server computers, server farms, server clusters, or any other appropriate arrangement and/or combination.

In exemplary operation, a customer using client computing devices 104, 106 or 108, may interact with cloud infrastructure system 102 by requesting one or more services provided by cloud infrastructure system 102. The customer may issue service request 134 cloud infrastructure system 102 using a variety of means. Service request 134 may include placing an order for a subscription for one or more services offered by cloud infrastructure system 102, accessing one or more services offered by cloud infrastructure system 102, or the like. In certain embodiments, the customer may access a cloud UI 132, 134, and 138 and place a subscription order via these UIs. The order information received by cloud infrastructure system 102 in response to the customer placing an order may include information identifying the customer and one or more services offered by the cloud infrastructure system 102 to which the customer intends to subscribe. After an order has been placed by the customer, the order information is received via cloud UIs, 132, 134, and/or 138.

In this example, order management and monitoring module 112 sends information received from a customer to an order database to have the order placed by the customer stored. The order database can be one of several databases operated by cloud infrastructure system 102 and operated in conjunction with other system elements. Order management and monitoring module 112 may forward information that includes all or part of the order information stored in the order database to an order management module. In some instances, the order management module may be configured to perform billing and accounting functions related to the order, such as verifying the order, and upon verification, booking the order.

In certain embodiments, cloud infrastructure system 100 may include identity management module 114. Identity management module 114 may be configured to provide identity services, such as access management and authorization services in cloud infrastructure system 102. In some embodiments, identity management module 114 may control information about customers who wish to utilize the services provided by cloud infrastructure system 102. Such information can include information that authenticates the identities of such customers and information that describes which actions those customers are authorized to perform relative to various system resources (e.g., files, directories, applications, communication ports, memory segments, etc.) Identity management module 114 may also include the management of descriptive information about each customer and about how and by whom that descriptive information can be accessed and modified.

In certain embodiments, cloud infrastructure system 102 may also include infrastructure resources 116 for providing the resources used to provide various services to customers of cloud infrastructure system 102. In one embodiment, infrastructure resources 116 may include pre-integrated and optimized combinations of hardware, such as servers, storage, and networking resources to execute the services provided by the PaaS platform and the SaaS platform.

In some embodiments, resources in cloud infrastructure system 102 may be shared by multiple users and dynamically re-allocated per demand. Additionally, resources may be allocated to users in different time zones. For example, cloud infrastructure system 102 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 118 may be provided that are shared by different components or modules of cloud infrastructure system 102 and by the services provided by cloud infrastructure system 102. These internal shared services 118 may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, a number of external shared services 120 may be provided that are shared by different components or modules of cloud infrastructure system 102 and by the services provided by cloud infrastructure system 102. These external shared services 120 may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In various embodiments, external shared services 120 may include one or more components that provide access, data transformation, automation, or the like to enterprise computer system(s) 126. Access to enterprise computer system(s) 126 may be shared by different components or modules of cloud infrastructure system 102 and by the services provided by cloud infrastructure system 102. In some embodiments, access to enterprise computer system(s) 126 may be shared by service instances provided by cloud infrastructure system 102 that are restricted to one or more subscribers.

In further embodiments, external shared services 120 may include external application programming interface ("API") services 128 that are shared by different components or modules of cloud infrastructure system 102 and by the services provided by cloud infrastructure system 102. These external API services 128 may include, without limitation, APIs provided by other third party services or entities.

Various different mobile cloud services may be provided by MCS 122 in cloud infrastructure system 102. MCS 122 facilitates communication between a mobile computing device and enterprise computer systems (e.g., enterprise computer systems 124 and 126) according to some embodiments of the present invention. MCS 122 may include one or more memory storage devices ("local storage") used to store enterprise data and authentication information. Enterprise data may be received from enterprise computer systems 126 or from client computing devices 104, 106, or 108 or may include enterprise data converted by cloud infrastructure system 102, or combinations thereof. Authentication information may be received from identity management system 116 and/or generated by cloud infrastructure system 102. In some embodiments, authentication information may include information indicating security authentication of a user with regard to a request for a service.

Enterprise computer systems, such as enterprise computer systems 126 may be physically located beyond a firewall of cloud infrastructure system 102 at a different geographic location (e.g., remote geographic location) than cloud infrastructure system 102. In some embodiments, enterprise computer systems 126 may include one or more different computers or servers. In some embodiments, enterprise computer systems 126 may be part of a single computer system.

In certain embodiments, enterprise computer systems 126 may communicate with cloud infrastructure system 102 using one or more different protocols. Each of enterprise computer systems 126 may communicate with cloud infrastructure system 102 using a different communication protocols. Enterprise computer systems 126 may support the same or different security protocols. In some embodiments, MCS 122 may include an agent system to handle communication with enterprise computer systems 126.

A protocol may include a communication protocol, such as SPeeDY ("SPDY"). A protocol may include an application protocol such as an HTTP-based protocol. In some embodiments, enterprise computer systems 126 may communicate with cloud infrastructure system 102 using a communication protocol such as REST or Simple Object Access Protocol ("SOAP"). For example, REST protocol may support a formats including uniform resource identifier ("URI") or uniform resource locator ("URL"). Enterprise Data formatted for communication using REST protocol may be easily converted to data formats such as JavaScript Object Notation ("JSON"), comma-separated values ("CSV"), and really simple syndication ("RSS"). Enterprise computer systems 126 and cloud infrastructure system 102 may communicate using other protocols such as remote procedure calls ("RPC") (e.g., extended markup language ("XML") RPC).

In some embodiments, MCS 122 may include an adaptor interface configured to support communication with one or more services provided by cloud infrastructure service 102, some of which may support different protocols or techniques for communications. In some embodiments, MCS 122 may include an adaptor interface configured to support communication with enterprise computer systems 126, some of which may support different protocols or techniques for communications. MCS 122 may include one or more adaptors each of which may be configured to communicate according to a communication protocol, a type of enterprise computer system, a type of application, a type of service, or combinations thereof. A communication protocol supported by an adaptor may be specific to a service or one or more of enterprise computer systems 126.

In certain embodiments, client computing devices 104, 106, and 108 may each implement an application that can provide specific UIs to communicate with MCS 122. A specific UI may be configured to communicate using a specific communication protocol. In some embodiments, specific UIs may include callable interfaces, functions, routines, methods, and/or operations that may be invoked to communicate with MCS 122. Specific UIs may accept as input parameters for communicating with a service provided by cloud infrastructure service 102 or with enterprise computer systems 126 for enterprise data and/or to request a service. In some embodiments, communication through MCS 122 may be converted for communication using a custom communication protocol. In some embodiments, specific UIs may correspond to a custom client in an application.

MCS 122 may include one or more callable interfaces, e.g., an API. Callable interfaces associated with MCS 122 may enable an application on a mobile computing device to communicate requests to MCS 122. Callable interfaces associated with MCS 122 may support a common or standard interface, which may allow requests including their parameters to be received from apps according to a standardized protocol, architectural style, and/or format (e.g., a REST protocol). Callable interfaces associated with MCS 122 may be configurable by a user of any one of computing devices 104, 106, or 108. Callable interfaces associated with MCS 122 may receive requests for services according to a communication protocol. Device application developers can connect to MCS 122 for their custom applications. In some embodiments, a callable interface associated with MCS 122 may be configured by the same person that develops an app, such that the person can implement a custom application to communicate with MCS 122.

Callable interfaces associated with MCS 122 may further enable enterprise computer systems 126 to communicate with MCS 122 according to a standardized protocol or format. Similar to application developers, those who manage enterprise computer systems can implement code (e.g., an agent system) that is configured to communicate with MCS 122 via one or more callable interfaces. Callable interfaces associated with MCS 122 may be implemented based on a type of a computing device, a type of enterprise computer systems, an app, an agent system, a service, a protocol, or other criterion. In some embodiments, callable interfaces associated with MCS 122 may support requests for services including authentication, compression, encryption, pagination with cursors, client-based throttling, non-repudiation, logging, and metrics collection. In some embodiments, callable interfaces associated with MCS 122 may be implemented for custom business-related services, such as authentication, policy enforcement, caching of responses, throttling of calls to MCS 122, translation between asynchronous and synchronous patterns, logging of calls to underlying services, or combinations thereof. In some embodiments, callable interfaces associated with MCS 122 may enable users to load custom code for implementation by cloud infrastructure system 102. The custom code may implement one or more callable interfaces associated with MCS 122 for cloud infrastructure system 102, which can enable users to access custom services or other enterprise computer systems.

Protocol translators associated with MCS 122 may process a message to determine a communication protocol for a message and/or to convert a message to a communication protocol for a destination. Protocol translators associated with MCS 122 may convert a request received from client computing devices 104, 106, or 108. The request may be converted from a format of a communication protocol supported by client computing devices 104, 106, or 108 to a format of a communication protocol supported by a service provided by cloud infrastructure service 102 or enterprise computer systems 126. Protocol translators associated with MCS 122 may convert a response received from a service provided by cloud infrastructure service 102 or enterprise computer systems 126. A response may be converted from a format of a communication protocol supported by a service provided by cloud infrastructure service 102 or enterprise computer systems 126 to a format of a communication protocol supported by client computing devices 104, 106, or 108.

Security services associated with MCS 122 may manage security authentication for requests received from any of client computing devices 104, 106, or 108. Security services associated with MCS 122 may protect the integrity of customer processes and enterprise data. To prevent system or data from being compromised, security authentication may occur when a request is received from client computing devices 104, 106, or 108. Security authentication may be performed before a request is dispatched for processing by cloud infrastructure system 102. The security authentication determined for a user may enable a user associated with a mobile computing device to have authorization to request services via MCS 122. The security authentication may reduce efforts for a user to authenticate for different requests and/or services requested via MCS 122. Security services associated with MCS 122 may be implemented as one or more functional blocks or modules configured to perform various operations authenticating security of a request.

Authentication services associated with MCS 122 may manage security authentication for requests received from client computing devices 104, 106, or 108. Authentication services associated with MCS 122 may determine security authentication for a user associated with a computing device that sends a request to MCS 122. Security authentication may be determined based on a time period, which may be tied to operation of an application (e.g., launching an application), a request, a computing device, an enterprise computer system, other criterion related to a request, or combinations thereof. Security authentication may be verified and granted for any one of the following, such as an individual request, one or more enterprise computer systems, a particular service, a type of service, a user, a computing device, other criterion for determining security authentication, or combinations thereof. In some embodiments, cloud infrastructure system 102 may store authentication information of users received from enterprise computer systems or authentication systems supporting enterprise computer systems. Cloud infrastructure system 102 may determine authentication by performing a lookup function to determine whether an identity of a user associated with a request has authority to make such a request. The stored authentication information may include information such as the type of requests, functions, enterprise computer systems, enterprise data, or the like that a user may be authorized to access. In some embodiments, infrastructure system 102 may initiate communication with a requesting computing device to determine authentication.

In some embodiments, security authentication may be determined based on a role associated with a user requesting a service. The role may be associated with a user requesting access to MCS 122. In some embodiments, a user may request services as a subscriber or tenant of MCS 122 who may be granted access to resources and/or services provided by MCS 122. Authentication may correspond to a user's subscription to MCS 122, such that a user may be authorized to request services via MCS 122 as a subscriber. In some embodiments, the subscription may be limited to a particular set of resources provided by MCS 122. Security authentication may be based on the resources and/or services accessible to the user of MCS 122. In some embodiments, a request may be provisioned a template during execution called a "runtime environment." The runtime environment may be associated with resources that are allocated for a request, a user, or a device.

In some embodiments, authentication services associated with MCS 122 may request an identity management system to determine security authentication for the user. The identity management system may be implemented by cloud infrastructure system 102 (e.g., as identity management 114) or by another computer system that is external to cloud infrastructure system 102. Identity management 116 may determine security authentication of the user based on the user's role or subscription for accessing MCS 122. The role or subscription may be assigned privileges and/or entitlements with respect to an enterprise computer system, a service provided by an enterprise computer system, a function or feature of an enterprise computer system, other criterion for controlling access to an enterprise computer system, or combinations thereof.

Various different ADFs 124 may be provided in cloud infrastructure system 102. ADFs 124 provide the infrastructure code to implement agile SOA based applications. ADFs 124 further provide a visual and declarative approach to development through one or more development tools (e.g., "Oracle JDeveloper 11g" development tool). One or more frameworks provided by ADFs 124 may implement an MVC design pattern. Such frameworks offer an integrated solution that covers all the layers of the MVC architecture with solutions to such areas as Object/Relational mapping, data persistence, reusable controller layer, rich Web UI framework, data binding to UI, security and customization. Extending beyond the core Web based MVC approach, such frameworks also integrate with the Oracle SOA and Web-Center Portal frameworks simplifying the creation of complete composite applications.

In certain embodiments, ADFs 124 make it easy to develop agile applications that expose data as services by coupling a service interface to built-in business services provided by cloud infrastructure system 102. This separation of business service implementation details is performed in ADFs 124 via metadata. Use of this metadata-driven architecture enables application developers to focus on the business logic and user experience, rather than the details of how services are accessed. In certain embodiments, ADFs 124 store implementation details of services in metadata in a model layer. This enables developers to exchange services without modifying the UI, making the application extremely agile. Additionally, the developer creating the UI does not need to bother with business service access details. Instead, developers can focus on developing the application interface and interaction logic. Creating the user experience can be as simple as dragging-and-dropping the desired business services onto a visual page designer and indicating what type of component should represent that data.

In various embodiments, developers interact with ADFs 124 to create modules forming enterprise applications. The enterprise applications can be executed within the context of cloud infrastructure system 102. In various embodiments, developers interact with ADFs 124 to create modules forming mobile applications. The mobile applications can be executed within the context of cloud infrastructure system 102. Features of the present invention described below may be implemented using any desired combination of programming language and application development framework as will be apparent to one skilled in the relevant arts by reading the disclosure provided herein.

One or more frameworks provided by ADFs 124 may be embodied as Oracle ADF in one example. Accordingly, a framework in ADFs 124 can be based on an MVC design pattern. An MVC application is separated into: 1) a model layer that handles interaction with data-sources and runs the business logic, 2) a view layer that handles the application UI, and 3) a controller that manages the application flow and acts as the interface between the Model and the View layers. Separating applications into these three layers simplifies maintenance and reuse of components across applications. The independence of each layer from the others results in a loosely coupled, SOA.

In various embodiments, ADFs 124 provide tools and resources allowing developers to create an application in the form of multiple layers, each layer containing code modules/files implementing desired logic according to pre-defined specification. Thus, in one embodiment, ADFS 124 enables the application to be developed as four layers: a view layer containing code modules/files that provide the UI of the application, a controller layer containing code modules that control the flow of the application, a model layer containing data/code modules that provide an abstraction layer for the underlying data, and a business services layer containing code modules that provide access to data from various sources and handles business logic.

In certain embodiments, ADFs 124 let developers choose the technology they prefer to use when implementing each of the layers. Enterprise JavaBean ("EJB"), Web Services, JavaBeans, JPA/EclipseLink/TopLink objects, and many others can all be used as Business Services for ADFs 124. View layers can include Web based interfaces implemented with Java Server Faces ("JSF"), Desktop Swing applications and Microsoft Office front ends, as well as interfaces for mobile devices.

In one aspect, the view layer represents the UI of the application being developed. The view layer can include desktop, mobile, and browser-based views, each of which provides all or a portion of the UI and is accessible in a variety of manners corresponding to view type. For example, Web pages may be sent by the application in response to receiving client requests containing corresponding URLs. The Web pages may then be displayed by a browser on a display unit (not shown) associated with a requesting client system, thereby enabling users of the requesting client system to interact with the enterprise application. ADFs 124 support multi-channel access to business services allowing reuse of business services and access from a Web client, a client-server swing desktop-based application, Microsoft Excel spreadsheets, mobile devices such as a smart-phone, or the like.

The code files/modules forming the view layer (such as Web pages) may be implemented using one or more of hypertext markup language ("HTML"), Java server pages ("JSP"), and JSF. Alternatively, the UI may be implemented using Java components such as Swing, and/or XML. As further noted, the UI may leverage a user's experience and familiarity with desktop applications, such as Word and Excel by Microsoft.

As noted above, the relevant user-developed code/data modules are provided in each of the layers. However, each layer typically contains other pre-defined code/data modules provided by ADFs 124. Some of the pre-defined modules may be used during development, for example, as templates for developing the Web pages, for including desired functionality in the developed code etc. Other pre-defined modules (such as a URL rewriting module) may be deployed along with the developed application and may provide additional functionalities (mapping of requested URLs to internal names) to the user during execution of the enterprise application.

A controller layer contains code modules/files that control the flow of the application. Each controller object contains software instructions and/or data implemented according to a desired manner of presenting information in the view layer. The desired manner may include the specific Web pages to be displayed when links in another Web page are clicked/selected by the user, the page to be displayed when errors occur during execution, indicating the specific data to be stored/retrieved, etc.

In one aspect, the controller layer manages the applications flow and handles user input. For example, when a Search button is clicked on a page, the controller determines what action to perform (do a search) and where to navigate to (the results page). There are two controller options for Web-based applications in JDeveloper: the standard JSF controller or the ADF Controller that extends the JSF controller functionality. Whichever controller is used, application flow is typically designed by laying out pages and navigation rules on a diagram. An application's flow can be broken into smaller, reusable task flows; include non-visual components such as method calls and decision points in a flow; and create "page fragment" flows that run inside a region of a single containing page.

The code modules/files forming the controller layer are often implemented as Java servlets receiving the client requests and sending desired Web pages as corresponding responses. Controller objects may also be implemented, for example, as Apache Jakarta Struts controllers or according to the JSF standard.

A model layer contains data/code modules that connect various business services to the objects that use them in the other layers, such as to the controller objects discussed above or directly to desktop applications. Each abstract data object of the model layer provides a corresponding interface that can be used to access any type of business service executing in an underlying business service layer. The data objects may abstract the business service implementation details of a service from a client and/or expose data control methods/attributes to view components, thus providing a separation of the view and data layers.

In one aspect, the model layer consists of two components, data controls and data bindings, which utilize metadata files to define the interface. Data controls abstract the business service implementation details from clients. Data bindings expose data control methods and attributes to UI components, providing a clean separation of the view and model. Due to the metadata architecture of the model layer, developers get the same development experience when binding any type of Business Service layer implementation to the View and Controller layers.

In certain embodiments, ADFs 124 emphasize the use of the declarative programming paradigm throughout the development process to allow users to focus on the logic of application creation without having to get into implementation details. At a high level, the development process for a Fusion Web application usually involves creating an application workspace. Using a wizard, libraries and configuration needed for technologies selected by a developer are automatically added and an application is structured into projects with packages and directories.

By modeling database objects, an online database or offline replica of any database can be created, definitions edited, and schemas updated. Using a unified modeling language ("UML") modeler, use cases can then be created for the application. Application control and navigation can also be designed. Diagrammers can be used to visually determine the flow of application control and navigation. Then, an underlying XML file describing the flow can be automatically created. A resource library can be used to allow a developer to view and use imported libraries by simply dragging and dropping them into the application. From database tables, entity objects can be created using wizards or dialogs. From those entity objects, view objects are created to be used by pages in the application. Validation rules and other types of business logic can be implemented.

In this example, a business services layer manages interaction with a data persistence layer. It provides such services as data persistence, object/relational mapping, transaction management, and business logic execution. The business services layer can be implemented in any of the following options: as simple Java classes, EJB, Web services, JPA objects, and Oracle ADF Business Components. In addition, data can be consumed directly from files (XML or CSV) as well as REST. Thus, each business service manages interaction with a corresponding data persistence layer, and also provides such services as object/relational mapping, transaction management, business logic execution, etc. The business services layer may be implemented using one or more of simple Java classes, Enterprise Java Beans, Web services, etc.

Business components represent a business service implemented using, for example, "Oracle ADF Business Components" from Oracle Corp., to provide interaction with databases, Web services, legacy systems, application servers, and the like. In one embodiment, business components of the business services layer contain a mixture of application modules, view/query objects, and entity objects, which cooperate to provide the business service implementation. An application module can be a transactional component/code module that UI clients communicate with for working with application/transaction data. The application module may provide an updatable data model and also procedures/functions (commonly referred to as service methods) related to user transactions.

An entity object may represent a corresponding row in a database table and simplifies the manipulation (update, deletion, etc.) of the data stored in the corresponding row. An entity object often encapsulates business logic for the corresponding row to ensure that the desired business rules are consistently enforced. An entity object may also be associated with other entity objects to reflect relationships existing between rows stored in the underlying database.

III. Privacy, Residency and Security

Privacy, Residency and Security (PRS) relates to addressing the issues of obfuscating data that goes into the cloud. Two common methods of obfuscation are encryption and tokenization. Using either of these approaches ensures that data remains undecipherable to prying eyes while the organization enjoys the benefits of cloud-based applications offered by cloud infrastructure system 102.

Figure 2:
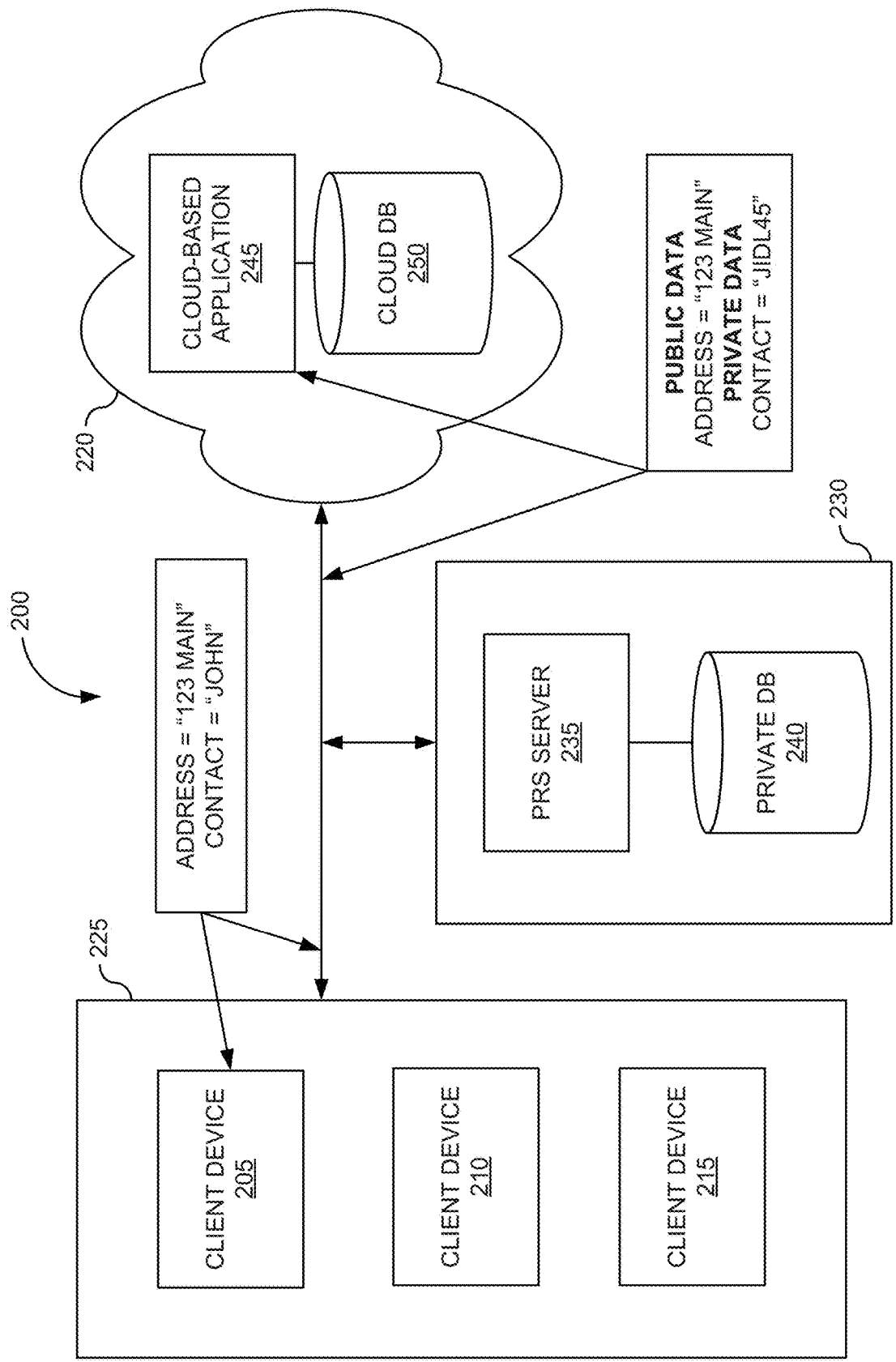
FIG. 2 is a block diagram of a system providing privacy, residency, and security with cloud-based applications in one embodiment according to the present invention.

FIG. 2 is a block diagram of system 200 providing privacy, residency, and security with cloud-based applications in accordance with some embodiments of the present disclosure. In the illustrated embodiment in FIG. 2, system 200 includes one or more client computing devices 205, 210, and 215 that may be used by users to interact with a cloud infrastructure system 220 (e.g., the cloud infrastructure system 102 described with respect to FIG. 1) that provides cloud services, including services for providing access to data that may or may not be obfuscated. It should be appreciated that system 200 may have other components than those depicted. Further, the embodiment shown in FIG. 2 is only one example of a system for providing privacy, residency, and security with cloud-based applications that may incorporate some embodiments. In some other embodiments, system 200 may have more or fewer components than shown in the figure, may combine two or more components, or may have a different configuration or arrangement of components.

In this example, system 200 includes enterprise infrastructure system 225, PRS system 230, and cloud infrastructure system 220. Enterprise infrastructure system 225 can include one or more client devices, servers, networking devices, routers, proxies, gateways, and the like. As illustrated, enterprise infrastructure system 225 includes one or more client computing devices 205, 210, and 215 in communication with the PRS system 230 and the cloud infrastructure system 220. As illustrated, PRS system 230 includes a PRS server 235 and a private database 240, and the cloud infrastructure system 220 includes a cloud-based application 245 and a cloud database 250.

Client computing devices 205, 210, and 215 may be devices similar to those described above for 104, 106, and 108 shown in FIG. 1. Client computing devices 205, 210, and 215 may be configured to operate a client application such as a web browser, a proprietary client application (e.g., Oracle Forms), or some other application, which may be used by a user of the client computing device to interact with cloud infrastructure system 220 to use services provided by cloud infrastructure system 220. Although exemplary system environment 200 is shown with three client computing devices, any number of client computing devices may be supported. Other devices such as devices with sensors, etc. may interact with cloud infrastructure system 220.

Client computing devices 205, 210, and 215 may be portable handheld devices (e.g., an iPhone®, cellular telephone, an iPad®, computing tablet, a personal digital assistant ("PDA")) or wearable devices (e.g., a Google Glass® head mounted display), running software such as Microsoft Windows Mobile®, and/or a variety of mobile OSs such as iOS, Windows Phone, Android, BlackBerry 10, Palm OS, and the like, and being Internet, e-mail, short message service ("SMS"), Blackberry®, or other communication protocol enabled. Client computing devices 205, 210, and 215 can be general-purpose personal computers including, by way of example, personal computers and/or laptop computers running various versions of Microsoft Windows®, Apple Macintosh®, and/or Linux OSs. Client computing devices 205, 210, 215 can be workstation computers running any of a variety of commercially available UNIX® or UNIX-like OSs, including without limitation the variety of GNU/Linux OSs, such as for example, Google Chrome OS. Alternatively, or in addition, client computing devices 205, 210, and 215 may be any other electronic device, such as a thin-client computer, an Internet-enabled gaming system (e.g., a Microsoft Xbox gaming console with or without a Kinect® gesture input device), and/or a personal messaging device, capable of communicating over one or more networks.

PRS server 235 may comprise one or more computers and/or servers. These computer systems or servers may be composed of one or more general purpose computers, specialized server computers (including, by way of example, personal computer ("PC") servers, UNIX® servers, mid-range servers, mainframe computers, rack-mounted servers, etc.), server farms, server clusters, or any other appropriate arrangement and/or combination. One or more computer systems or servers associated with PRS server 235 may run an OS including any of those discussed above, as well as any commercially available server OS. One or more computer systems or servers associated with PRS server 235 may also run any of a variety of additional server applications and/or mid-tier applications, including hypertext transport protocol ("HTTP") servers, file transfer protocol ("FTP") servers, common gateway interface ("CGI") servers, JAVA® servers, database servers, email servers, reverse proxies, and the like.

In certain embodiments, services provided by PRS server 235 may include a host of services, such as data privacy, residency, and security. PRS server 235 can be graphically installed and configured to support cloud application-specific requirements using application-specific adaptors. In some examples, PRS server 235 may provide data privacy by protecting data leaving enterprise infrastructure system 225, for example by using encryption or tokenization. PRS server 235 can seamlessly intercept data transmissions between client computing devices 205, 210, and 215 and cloud-based application 245, replacing sensitive data with replacement data, e.g., a token or encrypted data. As defined by the organization, sensitive data that cannot, or should not, leave enterprise infrastructure system 225 remains in private database 240, e.g., behind the firewall of PRS system 230, while users of the client computing devices 205, 210, and 215 experience virtually all of the functionality of the cloud-based application 245, regardless of where the sensitive data resides. PRS server 235 can perform "encryption on the fly" where instead of storing and managing, the sensitive data locally, the sensitive data is encrypted or tokenized before it is sent to cloud-based application 245, and decrypted or substitute with the sensitive data on the return. The sensitive data received by the cloud-based application 245 and optionally stored in cloud database 250 itself, if accessed directly without PRS system 230, would appear only as an encrypted list of values or tokens.

PRS server 235 may provide data residency by preventing data that meets certain conditions, e.g., sensitive data, from leaving enterprise infrastructure system 225. PRS server 235 can identify specific pieces of data from the data transmission that meet the conditions, save the specific pieces of data to the private database 240, generate replacement values (e.g., encryption values or tokens) for the real values of the identified specific pieces of data, and send the generated replacement values to the cloud-based application 245. The real values for the identified specific pieces of data remain resident locally in the private database 240, which may be governed by local statutes and operate under corporate policy. Thus, cloud-based application 245 operates with the replacement data, which can be stored in cloud database 250. PRS server 235 can categorize cloud application data, such as using categories as tokens, sortable tokens, encrypted values, and clear text. In some embodiments, the data can be protected on a field-by-field basis using an obfuscation strategy as discussed in detail herein.

PRS server 235 may provide data privacy, residency, and security by managing access to data stored in private database 240. PRS server 235 can ensure that only authorized access to cloud-based application 245 occurs from the organization. PRS server 235 can create a secure authentication link between enterprise infrastructure system 225 and cloud infrastructure system 220. In one embodiment, PRS server 235 is configured to utilize algorithmic schemes of encryption to transform plain text information detected in a network transmission into a non-readable cipher text. PRS server 235 may provide key management allowing PRS server 235 to encrypt and decrypt data within network transmissions. The key management may include the ability to generate, distribute, store, rotate, and revoke/destroy cryptographic keys as needed to protect the sensitive data with which they are associated. In other embodiments, PRS server 235 is configured to utilize tokenization for the protection of the sensitive data. PRS server 235 can use data substitution with a token (or alias) as a replacement for the real values. In the process of tokenization, PRS server 235 intercepts sensitive data and sends the data to private database 235 where it is stored securely. At the same time, PRS server 235 can generate a random unique set of characters (the token) and return the token for use in place of the real data. PRS server 235 (or private database 240) can maintain a reference database that allows the token value to be exchanged for the real data when it is needed again.

Accordingly, PRS server 235 can allow the encrypted value or the token value, which has no meaning whatsoever to prying eyes, to be used in various cloud-based applications as a reliable substitute for the real data, such as with cloud-based application 245. Cloud-based application 245 can be representative of one or more enterprise applications developed using ADFs 124 as discussed with respect to FIG. 1. The enterprise applications can be executed within the context of cloud infrastructure system 220. Cloud-based application 245 can include a MVC application separated into: 1) a model layer that handles interaction with cloud database 250 and runs the business logic, 2) a view layer that handles the application UI delivered to one or more of the client devices 205, 210, and 215, and 3) a controller that manages the application flow and acts as the interface between the Model and the View layers.

In one aspect, the view layer represents the UI of the application being developed. The view layer can include desktop, mobile, and browser-based views, each of which provides all or a portion of the UI and is accessible in a variety of manners corresponding to view type. For example, Web pages may be sent by cloud-based application 245 in response to receiving client requests containing corresponding URLs from one or more of the client devices 205, 210, and 215. The Web pages may then be displayed by a browser on a display unit (not shown) associated with one or more of the client devices 205, 210, and 215, thereby enabling users of the one or more client devices 205, 210, and 215 to interact with cloud-based application 245. The code files/modules forming the view layer (such as Web pages) may be implemented using one or more of hypertext markup language ("HTML"), Java server pages ("JSP"), and JSF. Alternatively, the UI may be implemented using Java components such as Swing, and/or XML. As further noted, the UI may leverage a user's experience and familiarity with desktop applications, such as Word and Excel by Microsoft.

As noted above, the PRS server 235 may monitor (e.g., intercept) network traffic and enforce privacy, residency, and security policies. With regard to communications between the one or more client devices 205, 210, and 215 and cloud-based application 245, the PRS server 235 can intercept transmissions originating from the one or more client devices 205, 210, and 215 to enforce the privacy, residency, and security policies. In the illustrated example, the one or more client devices 205, 210, and 215 can send a network transmission that includes the following pieces of information: ADDRESS="123 MAIN" and CONTACT=JOHN" to the cloud infrastructure system 220. The PRS server 235 can intercept the network transmission and inspect its contents to determine whether any of the pieces of information are subject to the privacy, residency, and security policies. For example, the PRS server 235 can determine that the "CONTACT" piece of information is sensitive data subject to the privacy, residency, and security policies, and should not be transmitted to the cloud infrastructure system 220. The PRS server 235 can modify the network transmission to encrypt or tokenize the information as follows, with the "CONTACT" piece of information being designated as sensitive or private data: ADDRESS="123 MAIN" [Public Data] and CONTACT="JIDL45" [Private Data]. PRS server 235 can store the cryptographic key and/or the original data together with a token map in private database 240. PRS server 235 can then forward the modified network transmission with the replacement values (e.g., encryption values or tokens) to cloud-based application 245.

With regard to communications between the one or more client devices 205, 210, and 215 and cloud-based application 245, the PRS server 235 can intercept transmissions destined for the one or more client devices 205, 210, and 215 in a reverse the process to enforce the privacy, residency, and security policies. In the illustrated example, the PRS server 235 can determine that the "CONTACT" piece of information has been encrypted or tokenized, and the PRS server 220 can modify the network transmission to decrypt or detokenize the information using the cryptographic key and/or the original data together with a token map retrieved from private database 240. The PRS server 235 can then forward the modified network transmission to the one or more client devices 205, 210, and 215.

Figure 3A:
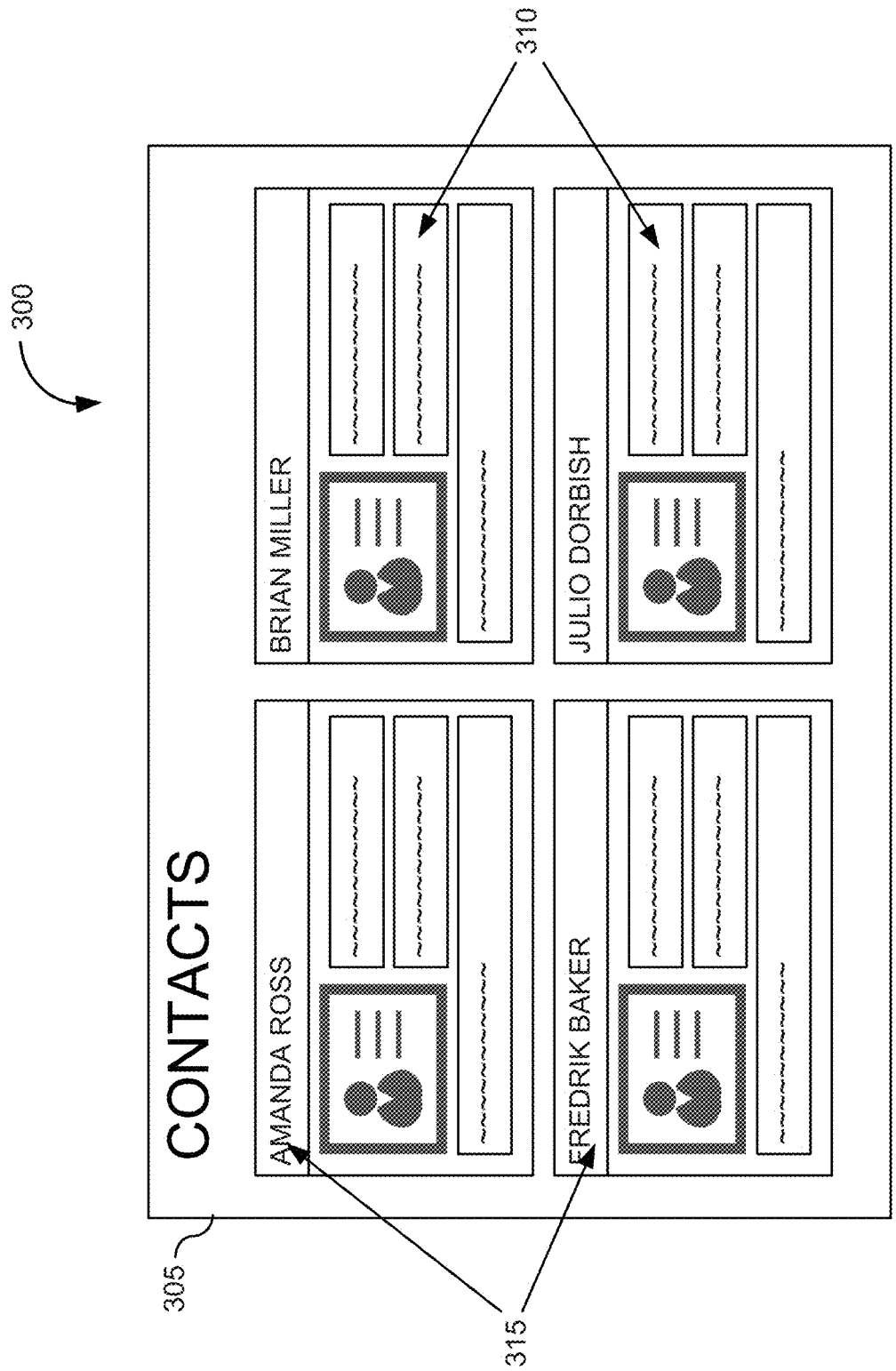
FIG. 3A is an illustration of a user interface (UI) page associated with a cloud-based application when viewed using a client device from within an enterprise infrastructure system in one embodiment according to the present invention.
Figure 3B:
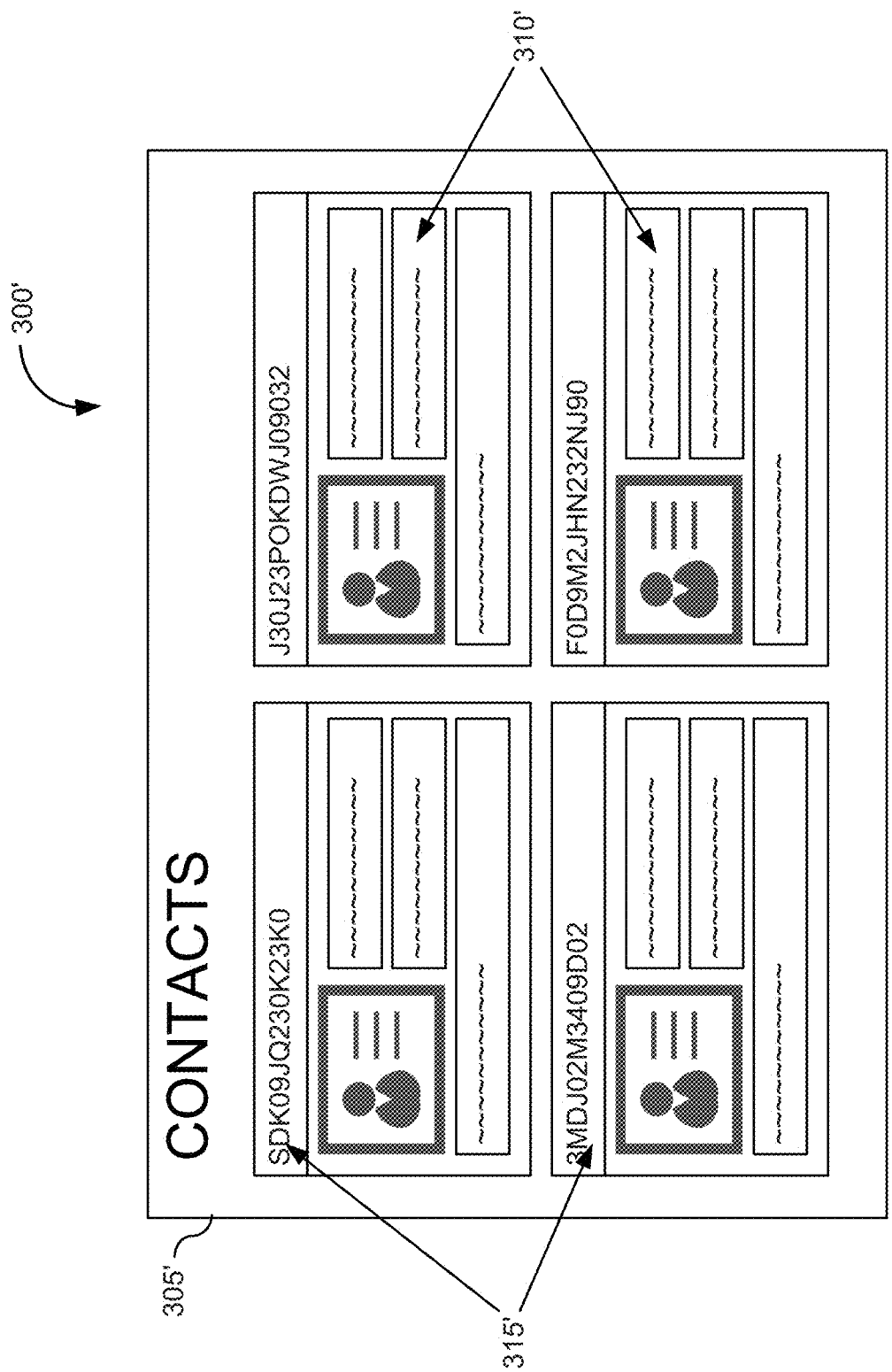
FIG. 3B is an illustration of a UI page associated with a cloud-based application when viewed using from within a cloud infrastructure system in one embodiment according to the present invention.

FIG. 3A is an illustration of a UI 300 associated with the cloud-based application 245 when viewed using the one or more client devices 205, 210, and 215 from within the enterprise infrastructure system 225. As illustrated, a "Contacts" page 305 is displayed with one or more contact cards 310. The name of each contact 315 is visible together with other UI elements, such as a photo and other data fields including the address. An administrator of the PRS server 235 can designate the name field of UI page 300 as protected data as described in detail herein. FIG. 3B is an illustration of a UI 300' associated with cloud-based application 245 when viewed from within cloud infrastructure system 220 or using a computing device to access the cloud-based application 245 from a location outside of the enterprise infrastructure system 225. As illustrated, the "Contacts" page 305' is displayed with the same contact cards 310'; however, the name of each contact 315' is encrypted or replaced with tokenized data while the other UI elements such as a photo and other data fields including the address remain with the real values.

IV. Self Describing Configuration

In some embodiments, a model layer associated with cloud-based application 245 contains data/code modules that connect various business services to the objects that use them in the other layers, such as to the controller objects discussed above or directly to desktop applications. Each abstract data object of the model layer provides a corresponding interface that can be used to access any type of business service executing in an underlying business service layer. The data objects may abstract the business service implementation details of a service from a client and/or expose data control methods/attributes to view components, thus providing a separation of the view and data layers.

In one aspect, the model layer consists of two components, data controls and data bindings, which utilize metadata files to define the UI. Data controls abstract the business service implementation details from clients. Data bindings expose data control methods and attributes to UI components, providing a clean separation of the view and model. By modeling database objects, cloud database 250 can be created for use with cloud-application 245. From database tables, entity objects can be created using wizards or dialogs. From those entity objects, view objects are created to be used by pages in the application. Validation rules and other types of business logic can be implemented.

An entity object may represent a corresponding row in a database table and simplifies the manipulation (update, deletion, etc.) of the data stored in the corresponding row. An entity object often encapsulates business logic for the corresponding row to ensure that the desired business rules are consistently enforced. An entity object may also be associated with other entity objects to reflect relationships existing between rows stored in the underlying database.

Thus, an entity object can be an ADF Business Component that represents a row in cloud database 250 and simplifies modifying its associated attributes. The entity object can be defined by specifying the database table in cloud database 250 whose rows it will represent. Associations can then be created to reflect relationships between entity objects. At runtime, entity rows are managed by a related entity definition object and each entity row is identified by a related row key. Entity rows are retrieved and modified in the context of an application module associated with cloud-based application 245 that provides the database transaction to cloud database 250.

Figure 4:
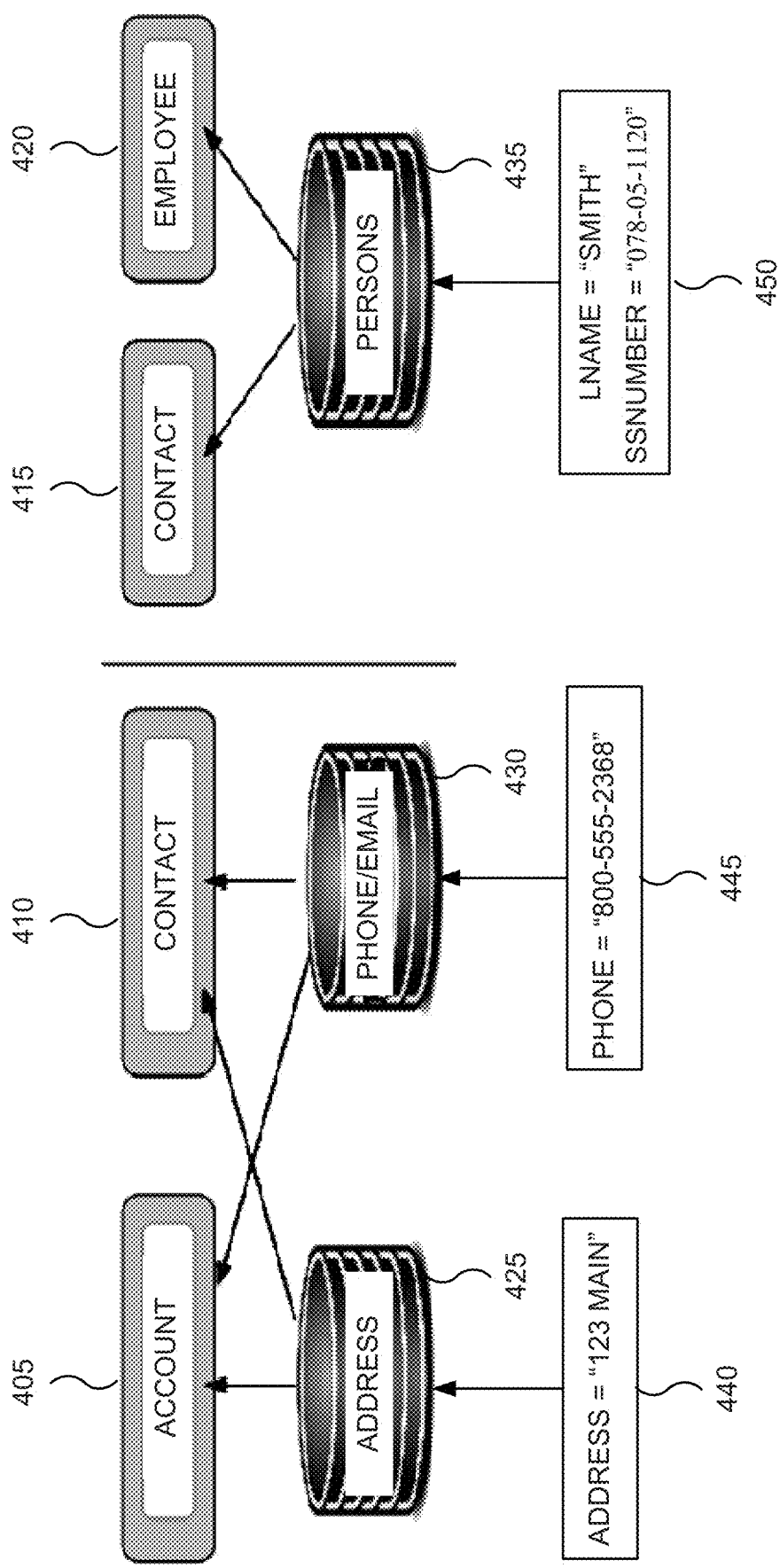
FIG. 4 is a block diagram illustrating attributes shared between entities in one embodiment according to the present invention.

FIG. 4 is a block diagram illustrating attributes shared between entities in one embodiment according to the present invention. FIG. 4 shows entity objects, e.g., account object 405, contact object 410, contact object 415, and employee object 420. FIG. 4 further shows database tables, e.g., address table 425, phone/email table 430, and persons table 435 that each includes various attributes 440, 445, and 450 shared between entities. As illustrated, address attributes 440 of account object 405 and contact object 410 can be stored in the same database table, e.g., address table 425. Each row can be identified by a related row key to specify whether the row holds the values for the address attributes 440 of account object 405 and/or contact object 410. Similarly, phone/email attributes 445 of account object 405 and contact object 410 can be stored in the same database table, e.g., phone/email table 430. As further illustrated, contact object 415 and employee object 420 can be a subtype of a person object having attributes 450 stored in persons table 435. Each row can be identified by a row key to specify the type of persons object that the row holds, e.g., whether a contact person or a employee person.

As the general approach of a PRS server is to sniff or monitor wire traffic and perform data encryption or tokenization on protected fields, it can be difficult to integrate this functionality with cloud-based applications utilizing components that share various entity objects as illustrated in FIG. 4. Conventionally a user might have to configure each UI page of each cloud-based application to mark the sensitive fields the user desires to have protected. For example, a user may need to configure the UI page for contact object 415 and the UI page for employee object 420 even though they share the same underlying database tables or attributes. This becomes very challenging with large and complicated applications. The user might have to go through all possible UI pages and configure each UI page one by one, even if regular expressions are used to reduce the amount of work performed by administrators. Additionally, as cloud-based applications may have components that are shared and reused, the same identifier of fields may be used on multiple UIs even though they do not necessarily reflect the actual "meaning" of the field. Using regular expressions is not only extremely painful, but also leads to possible sensitive data leak or unnecessary performance overhead on protecting non-sensitive data.

To overcome these problems, in some embodiments, the cloud infrastructure system 220 can provide one or more services for self-describing the configuration of entity objects, UI pages, etc. of cloud-based application 245 with respect to the PRS server 235. Cloud infrastructure system 220 can provide an API that allows an administrator of PRS server 235 (e.g., at the request of the organization associated with enterprise infrastructure system 225) to identify sensitive data at the data or component level of cloud-based application 245. For example, the administrator can mark the social security number attribute 450 of entity objects at the data level such that any and all contact and employee objects 415, 420 that include the social security number attribute 450 have their data protected no matter where the sensitive data is used outside of the enterprise infrastructure system 225. In another example, the administrator can mark the name attribute 450 of only certain types of entity objects (e.g., the employee object 420) at the component level such that only those entity objects used by the given component that include the name attribute 450 are protect when used by the given component outside of the enterprise infrastructure system 225. Cloud infrastructure system 220 can then dynamically generate a map between UI elements recognized by PRS server 235 and the marked fields. This way, cloud infrastructure system 220 can have a shared component protected no matter where it is used and what value is associated with the identifier. This reduces the need to have multiple entries maintained by the PRS server 235.

Once sensitive data objects are identified using the PRS server 235, in one embodiment, the administrator can (1) add hints to the component's underlying data layer and (2) add a protectionKey attribute to the component. When cloud-based application 245 generates a UI page using a protected entity object, any data involving those protected components is sent in the payload of the network transmission together with a map between the identifier and the field recognizable by the PRS server 235 to perform necessary data encryption/tokenization. Thus, when configuring components, a new attribute named protectionKey can be added to the EditableValue component that controls whether the value of the component should be protected or not. The value of the attribute can be the name of the component that the PRS server 235 recognizes. Logic can be added at the data binding layer of cloud-based application 245 to extract protection hints that include the value recognized by the PRS server 235. If protectionKey is not present at the component level, cloud-based application 245 can retrieve the protectionKey attribute from the data-binding layer. For requests sent to the cloud-based application 245, if there is protected data involved, a build id to protectionKey map can be put in the payload of the network transmission. Thus, instead of directly mapping component client identifiers to object/fields recognizable by the PRS server 235, the map can be generated on the fly based on a static configuration.

Figure 5:
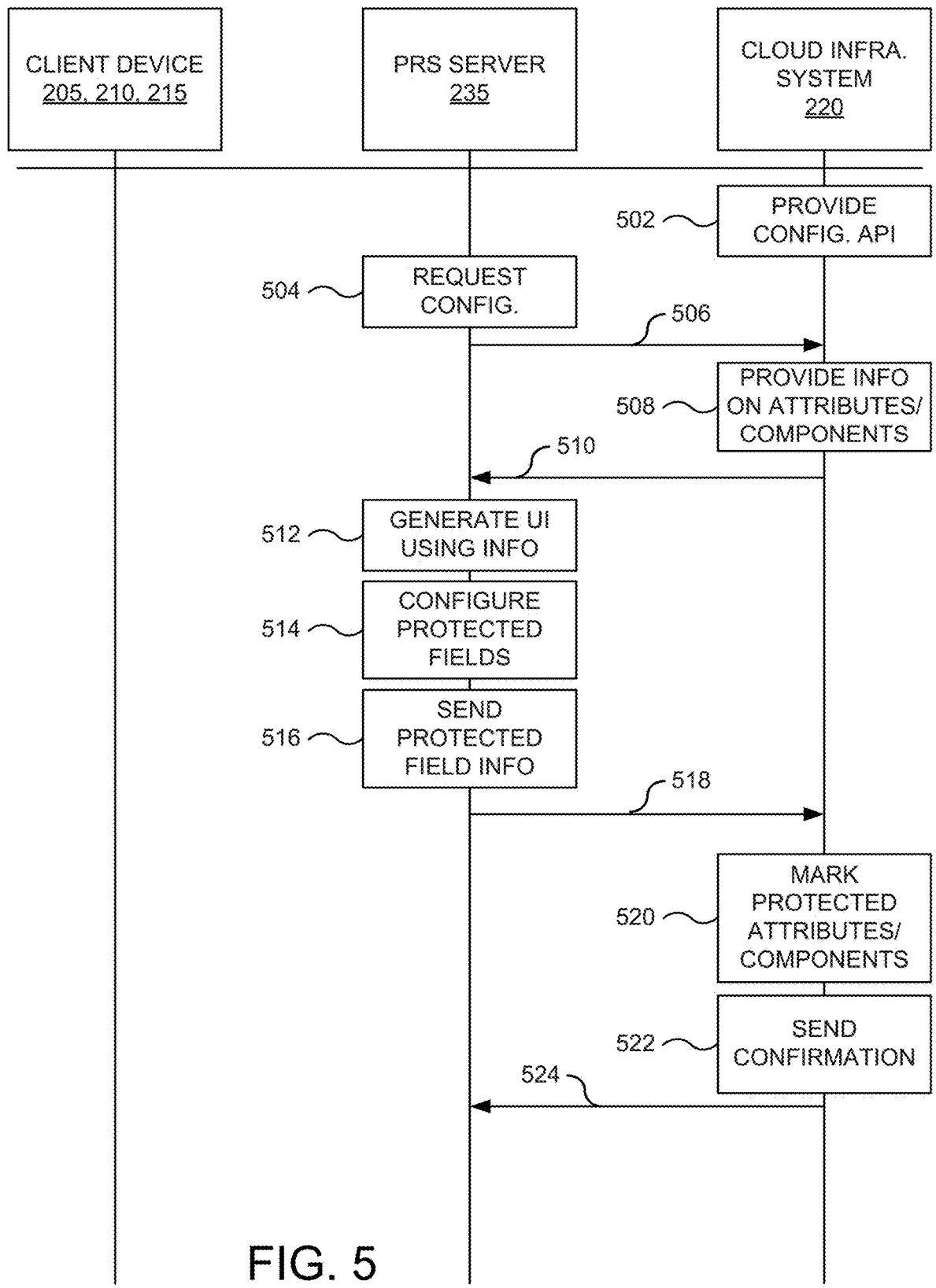
FIG. 5 illustrates a message sequence chart providing for self-describing configurations of a privacy, residency, and security server in one embodiment according to the present invention.

FIG. 5 illustrates a message sequence chart providing for self-describing configurations of the PRS server 235 in some embodiments. In block 502, the cloud infrastructure system 220 provides an API to a data model used by a cloud-based application 245 from which the PRS server 235 can access configurations. Providing the API may include providing a server-side endpoint that an application, or a designer, can hit with a request (typically an HTTP request, SOAP request, XML message, or the like). The server-side endpoint may be implemented using an HTTP endpoint that has a well-defined URL scheme (e.g., www.enterpirse.com/contacts). In block 504, the PRS server 235 requests configuration data of the data model from the cloud infrastructure system 220 using the provided API. The configuration data may include a set of protectable attributes/components of an entity modeled using the data model (e.g., information regarding attributes/components that can be configured to be subject to privacy, residency, and security policies). Request 506 can include an HTTP request, SOAP request, XML message, or the like. In block 508, cloud infrastructure system 220 provides the configuration data including a set of protectable attributes/components of the entity modeled using the data model. In some embodiments, the configuration data further includes a type of protection (e.g., tokenizable or encryptable) that may be applied to each attribute within the set of protectable attributes.

In one embodiment, cloud infrastructure system 220 maintains a list of protectable attributes/components used by cloud-based application 245. The cloud infrastructure system 220 may additionally send hints with the list of protectable attributes/components such as type information for protected fields to the PRS server 220. The hints may provide information concerning parameters of the protectable data. Cloud infrastructure system 220 returns response 510 having the following format:

```
<objects>
    <object name="emp" type="object">
        <field name="fname" protectable="protectable"
            tokenizable="tokenizable" type="short_text" max-
            Length="255"/>
            <description>Employee's first name</description>
        </field>
        <field name="lname" protectable="protectable"
            tokenizable="tokenizable" type="short_text" max-
            Length="255"/>
            <description>Employee's last name</description>
        </field>
        <field name="email" protectable="protectable"
            encryptable="encryptable" type="short_text" max-
            Length="255"/>
            <description>Employee's email address</description>
        </field>
    </object>
</objects>
```

In block 512, the PRS server 235 generates a user interface using the information on the protectable attributes/components received from cloud infrastructure system 220. The user interface allows for an administrator of the PRS server 235 to configure one or more protectable attributes/components of the entity modeled as a protected attribute/component. In block, 514, an administrator of the PRS server 235 (e.g., at the request of the organization associated with enterprise infrastructure system 225) configures one or more protectable attributes/components of the entity modeled, e.g. field "fname" in object "emp", in the user interface to be marked as a protected attribute/component. In some embodiments, the marking of the attribute/component as protected may further include an indication on the type of protection to be applied to the attribute/component (e.g., tokenization or encryption). In block 516, the PRS server 235 informs cloud infrastructure system 220 of the protected attribute/component by sending the protected attribute/component information generated with the user interface to the cloud infrastructure system 220. In one embodiment, the PRS server 220 sends message 518 having the following format:

```
<objects>
    <object name="emp" type="object">
        <field name="fname" protect="protect"
            tokenize="tokenize"/>
        <field name="lname" protect="protect"
            tokenize="tokenize"/>
    </object>
</objects>
```

In block 520, the cloud infrastructure system 220 marks designated components or entity object attributes as protected. In block 522, the cloud infrastructure system 220 may send confirmation information for protected fields to the PRS server 220. Cloud infrastructure system 210 may return response 524 having the following format:

```
<objects>
    <object name="emp" type="object">
        <field name="fname" protect="protect"
            tokenize="tokenize" type="short_text" max-
            Length="255"/>
        <field name="lname" protect="protect"
            tokenize="tokenize" type="short_text" max-
            Length="255"/>
    </object>
</objects>
```

Figure 6:
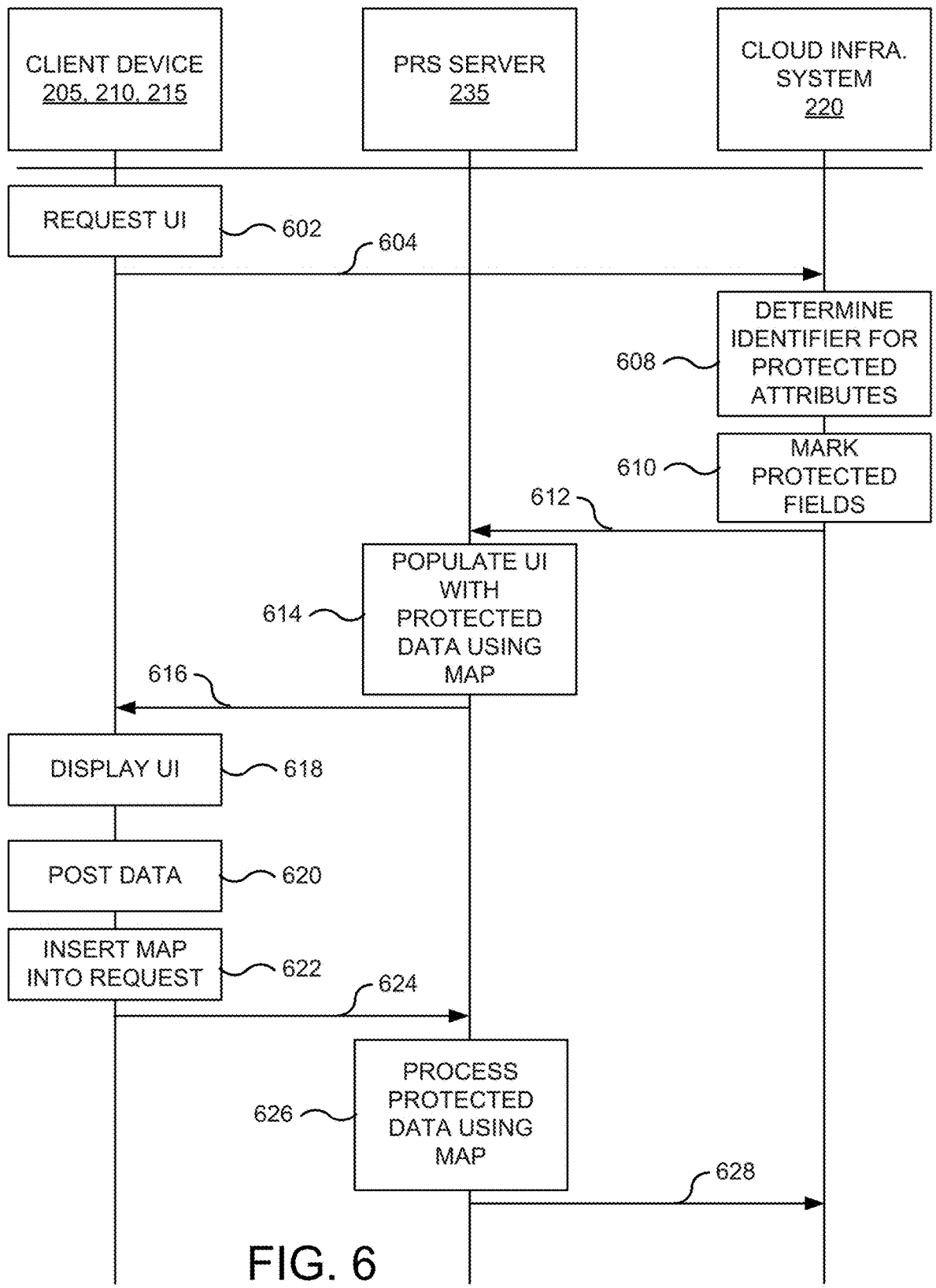
FIG. 6 illustrates a message sequence chart for utilizing self-describing configurations in one embodiment according to the present invention.

FIG. 6 illustrates a message sequence chart for utilizing self-describing configurations in one embodiment according to the present invention. In block 602, one or more of the client devices 205, 210, and 215 request a UI page or client component from the cloud infrastructure system 220. Request 604 can include an HTTP request, SOAP request, XML, message, or the like. In block 608, the cloud infrastructure system 220 determines an identifier for each protected attribute. In one embodiment, the UI or component runtime associated with cloud-based application 245 (e.g., Oracle ADF Faces rendering) asks the data model level for tokenization identifier of each protected field. In block 610, cloud infrastructure system 220 generates the UI or client component and marks the protected fields. Cloud infrastructure system 210 may return the generated UI or client component with marked protected fields in response 612. The marked protected fields generated in block 610 are included in the payload of the response 612. For example, marking the protected fields may have the following format:

```
<label class="af_inputText_label-text" for="it3::
content">Ename</label></td><td valign="top" nowrap
class="xve"><input id="it3::content" name="it3"
style="width:auto" class="x25" size="10" maxlength="10"
type="text" value="testname" protetionKey="EMP_OBJ/
Ename_FLD"></td>
``` and the generated UI or client component may have the following format:

AdfPage.PAGE.addComponents(newAdfRichInputText ('it3', {'columns': 10,'maximumLength': 10,'protectionKey':'EMP_OBJ/Ename_FLD'));

and a subsequent payload of the response 612 may contain map information having the following format:
oracle.adf.view.rich.TOKENIZED={'it3':{'EMP_OBJ/Ename_FLD'}'}

In block 614, the PRS server 235 intercepts response 612 and populates the UI or client component with any protected data from private database 240 using the map included in the payload of the response 612. For example, the PRS sever 235 uses the map to replace random tokenized values used for <field name="fname" protect="protect" tokenize="tokenize"/> with the sensitive data values stored in the private database 240 for the same protected field: <field name="fname" protect="protect" tokenize="tokenize"/>. The PRS server 235 then forwards the modified response 616 to the one or more client devices 205, 210, and 215. In block 618, the one or more client devices 205, 210, and 215 display the generated UI or client component that includes any protected data from the private database 240 in the protected fields.

In block 620, the one or more client devices 20, 210, and 215 may post data to the cloud infrastructure system 220. The posted data can include changes or updates to sensitive data of the protected fields within the UI or client component. In one embodiment, a client runtime (e.g., ADF Faces client) uses the tokenization information of the UI or client component to spoon feed mappings to the PRS server 235 using a well-known field (e.g., ProtectionKey). For example, the PRS server 235 may use the well-known field to look up its configuration and find corresponding actions (e.g., encryption or tokenizing). In block 622, the one or more client devices 205, 210, and 215 insert the mappings into a request 624 (e.g., generate ID→protectionKey Map such as oracle.adf.view.rich.TOKENIZED={'r1:0:foo:it1':{'object':'emp', 'field':'fname'}}). The one or more client devices 205, 210, and 215 may generate the request 624 as follows to include the mapping from block 622:
r1:0:foo:it1=SecretFirstName
r1:0:foo:it5=PublicLastName
r2:1:bar:it1=publicemail@oracle.com
javax.faces.ViewState=!-12t5t4tf7q
org.apache.myfaces.trinidad.faces.FORM=f1
Adf-Page-Id=0
event=b5
event.b5=<m xmlns="http://oracle.com/richClient/comm"><k v="type"><s>action</s></k></m>
oracle.adf.view.rich.PROCESS=f1,b5
oracle.adf.view.rich.TOKENIZED={'r1:0:foo:it1':{'object':'emp', 'field':'fname'}}

In block 626, the PRS server 235 intercepts the request 624, and replaces any protected data with encrypted or tokenized values using the map (e.g., ID→protectionKey Map) and stores the protected data in private database 225. The PRS 235 then forwards the modified request 628 to the cloud infrastructure system 220.

Thus, the administrator of the PRS server 235 can identify sensitive data at the data model/component level and mark them in a self-describing way. Any generated UI elements associated with cloud-based application can be dynamically mapped to object/field tokens recognized by the PRS server 235. This way, a shared component will always be protected no matter where it is used and what id values it has. Moreover, there is no need to add multiple entries to the PRS server 235.

V. Support Sharing the Same Table for Protected and Non-Protected Data Columns

The cloud database 250 can contain encrypted or tokenized versions of sensitive data. As suggested above, entity objects can share the same structure as well as share the same database table. Some entity objects can be protected while other entity objects are not protected. Traditionally, different database tables are required to serve different protection configurations consequently duplicating database tables.

To overcome these problems, in some embodiments, when the administrator of the PRS server 235 configures a protection rule of a component or a data object at the data object layer, a discriminate flag can be defined to identify to which component or data object a particular row belongs. Therefore, all components or data objects sharing the same structure, while having different protection rules, can still share the same database table. This simplifies administration work of maintaining multiple similar database tables, but also allows reuse of common logic operating on the structurally similar components or data objects, without raising any security concerns.

Figure 7:
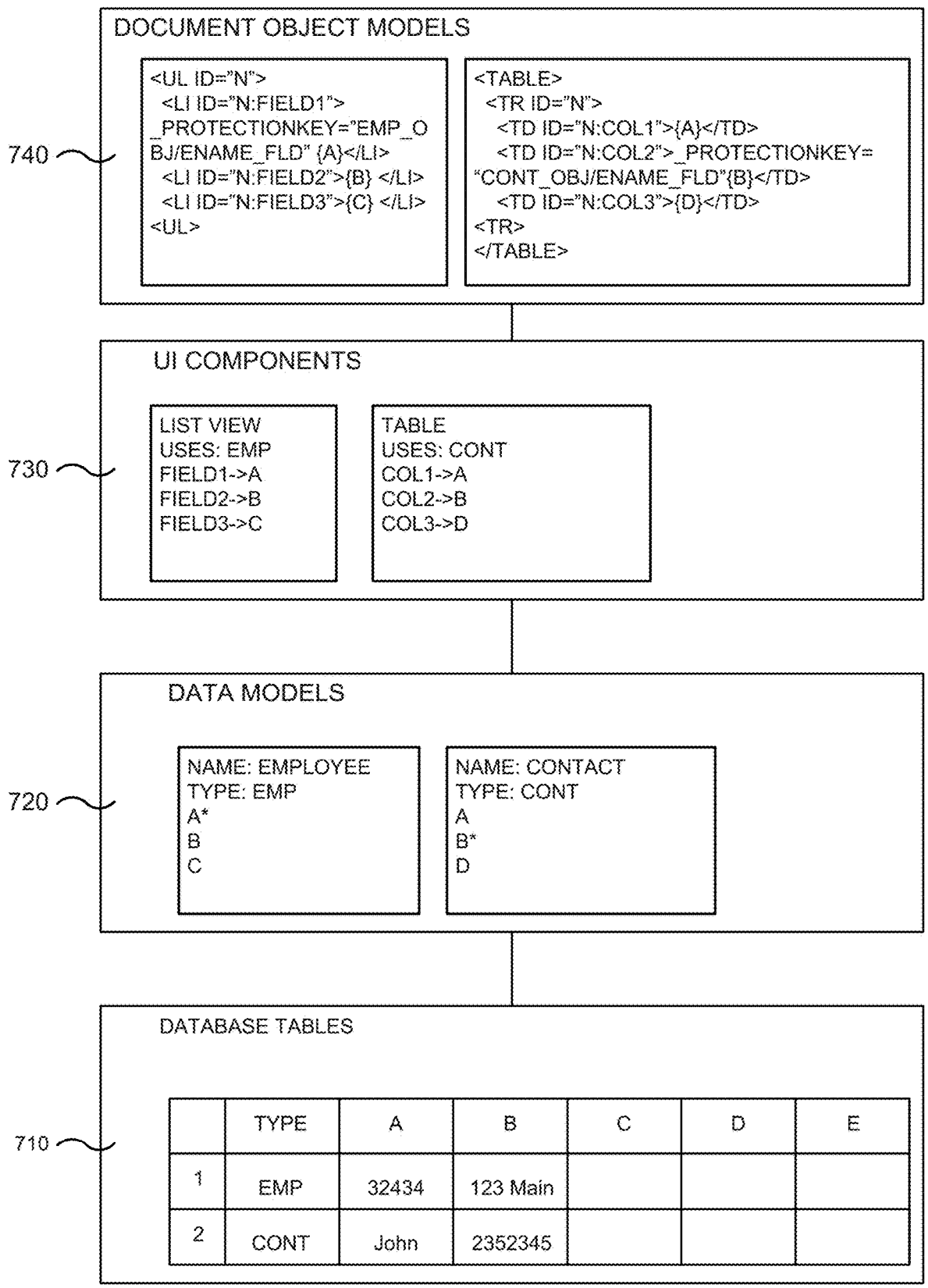
FIG. 7 is an illustration depicting various layers used with respect to a cloud-based application with self-describing configurations in accordance with one embodiment of the present invention.

FIG. 7 is an illustration depicting various layers used with respect to cloud-based application 245 in accordance with one embodiment of the present invention. Layer 710 is representative of data tables used by cloud-based application 245 that are stored in cloud database 250. The illustrated database table includes at least one column designated as the discriminate flag for the components or data objects, e.g., an entity discriminator attribute "TYPE." The illustrated database table can be configured to support a superset of attributes shared among multiple components or data objects used by cloud-based application 245. Using the discriminate flag, the components or data objects, e.g., the employee object and contact object, to which a particular row belongs, can be identified. As should be understood, multiple components or data objects can share the same database table while having different protection rules, e.g., tokenization, encryption, or non-protected.

Security configurations (i.e., protection rules of a component or a data object) can be placed at a layer above the database tables, e.g., data models layer 720. An attribute of each data model, e.g., TYPE, can be explicitly defined or implied. Because the discriminate flag is built into the data object only rows that belong to the data object should be picked up when the data object is used in the cloud-based application 245, e.g., such as being bound to various UI components. For example, in "Emp" object, "A" attribute is protected so it has two hints in data model layer: protectionState and protecionKey. These do not exist for "A" attribute in "Contact" object. Further, in "Contact" object, "B" attribute is protected so it has two hints in data model layer: protectionState and protecionKey. These do not exist for "B" attribute in "Emp" object. Data protection, therefore, is configured at the data object level so only the rows that belong to the data object will be subject to encryption/tokenization.

A data object can be bound to one or more UI components in UI layer 730. Typically, the data object is bound to a UI component for rendering one or more attributes of the data object. For example, a data object from data models layer 720 may be exposed to the UI layer 730 thru standard expression language such as <af:inputText id="FIELD1" value="# {EMPbinding.A.inputValue}"/>. In document object model layer 740, the rendered UI component can include identifiers indicating that certain document object models (DOM) elements are protected fields. As discussed above, the identifiers may include token identifiers generated by the PRS server 235.

Figure 8:
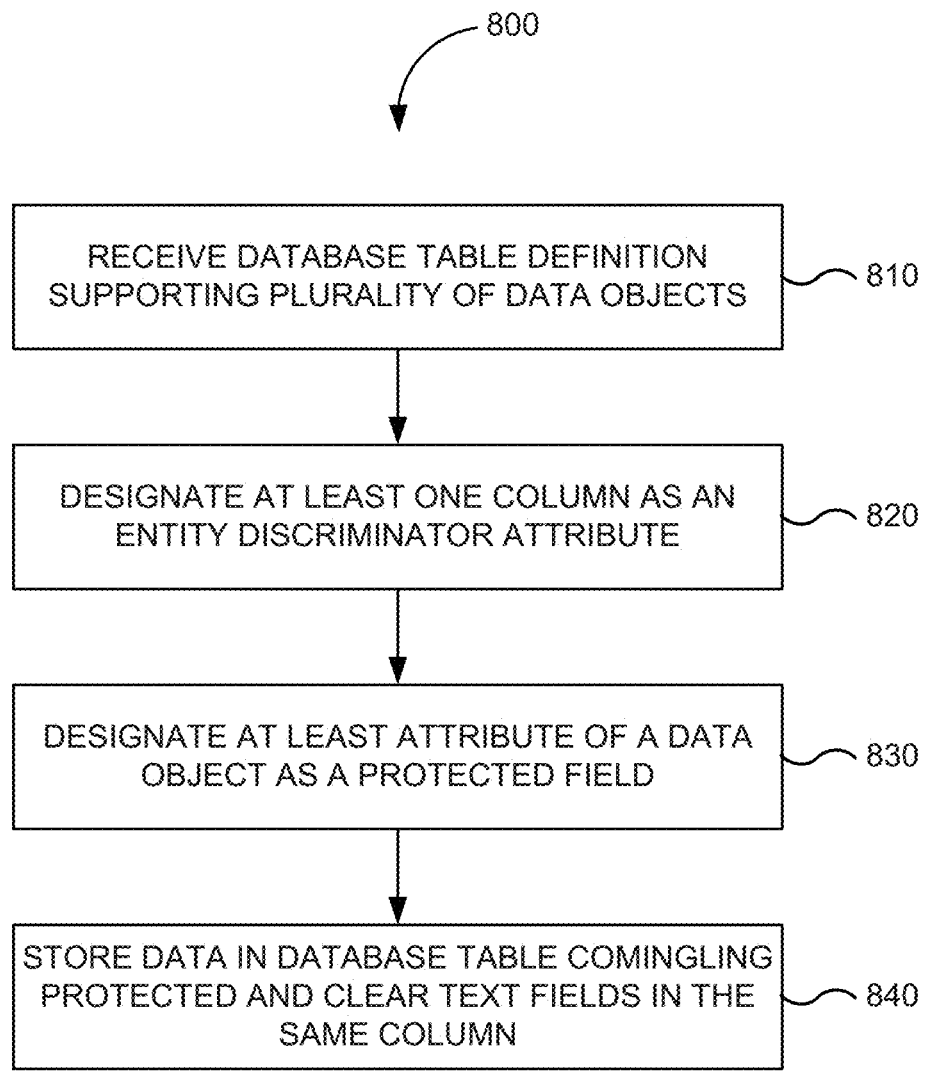
FIG. 8 is a flowchart of a method for supporting the sharing of the same table for encrypted and clear text columns in one embodiment according to the present invention.

FIG. 8 is a flowchart of method 800 for supporting the sharing of the same table for protected and non-protected data columns in one embodiment according to the present invention. Implementations of or processing in method 800 depicted in FIG. 8 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 800 depicted in FIG. 8 begins in step 810.

In step 810, a database table definition supporting a plurality of data objects is received. The database table can be defined to support a plurality of data objects. For example, a person table can include columns corresponding to a superset of attributes shared among the plurality of data objects. In step 820, at least one column is designated as the discriminate flag for the data objects. In some embodiments, a predetermined column of the database table can be used or a new column can be created for the discriminate flag.

In step 830, at least attribute of a data object supported by the database tables is designated as a protected field. As discussed above with respect to providing a self-describing configuration, the administrator of the PRS server 235 can request a list of data objects used by the cloud-based application 245. The administrator can select which data objects (and/or their individual attributes) are subject to security policies and send that information to cloud-based application 245. Cloud based application 245 can then configure any database tables, data models, and components that are required to be protected.

In step 840, data is stored in the database table commingling protected and non-protected data. Thus, when the administrator of the PRS server 235 configures a protection rule of a component or a data object at the data object layer, a discriminate flag can be defined to identify to which component or data object a particular row belongs. Therefore, all components or data objects sharing the same structure, while having different protection rules, can still share the same database table. This simplifies administration work of maintaining multiple similar database tables, but also allows reuse of common logic operating on the structurally similar components or data objects, without raising any security concerns.

VI. Automatic Operation Detection on Protected Field

As different data objects can have different protected fields, certain operations performed by cloud-based application 245 can become invalid if the operation is performed against protected fields. In some embodiments, the cloud-based application 245 can automatically determine operations that might be unsupported to avoid user confusion. For example, the cloud-based application 245 can exam all possible operators on protected data and make intelligent decisions on enabling/disabling them. This can greatly reduce the amount of work required to avoid generating erroneous results on certain operations performed against protected data. Self-describing configurations come are useful this case because when changes are made to the protection state of a certain field, the cloud-based application 245 becomes aware of the change and any related operators can be automatically enabled/disabled. Some examples of operations that can be enabled/disabled include server side validation on protected data, auto-suggest behavior on protected data, allow exact match on searching against protected data, sorting against protected data, and the like.

Figure 9:
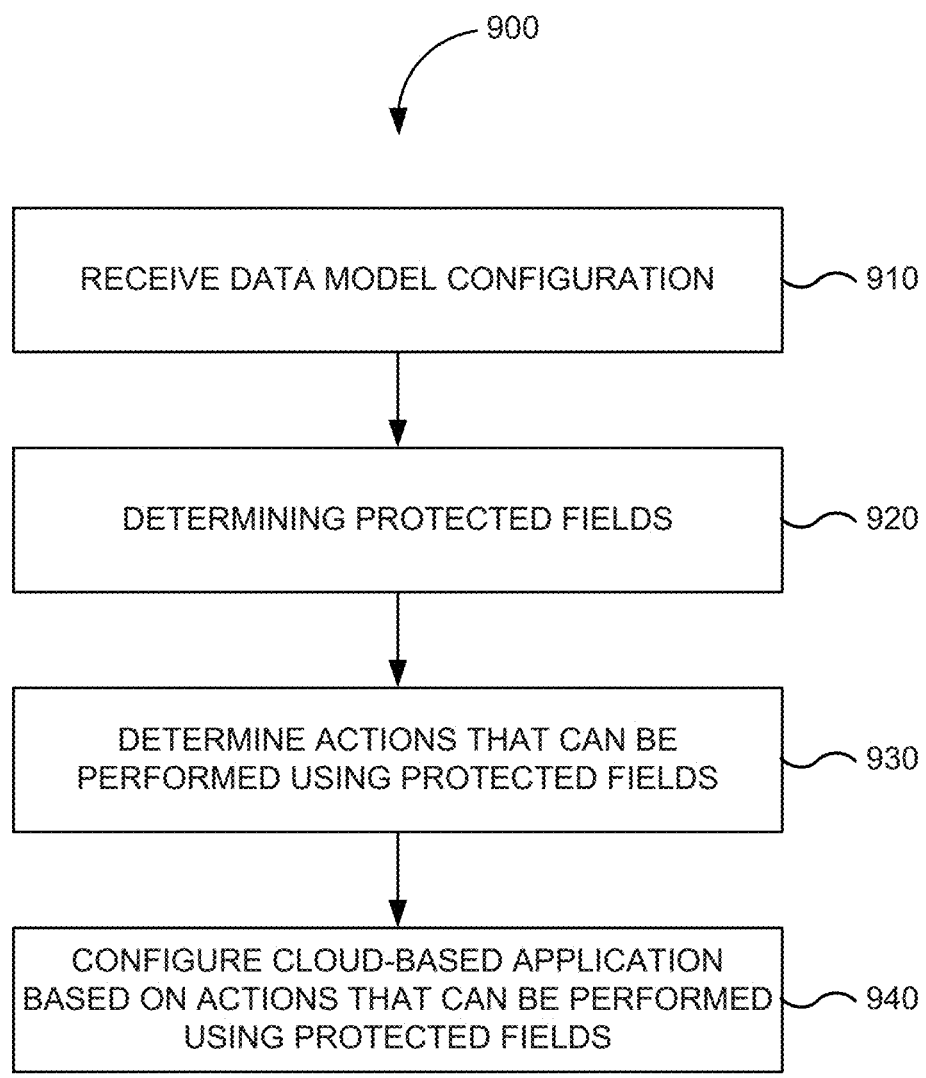
FIG. 9 is a flowchart of a method for automatic operation detection for protected fields in one embodiment according to the present invention.

FIG. 9 is a flowchart of method 900 for automatic operation detection for protected fields in one embodiment according to the present invention. Implementations of or processing in method 900 depicted in FIG. 9 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 900 depicted in FIG. 9 begins in step 910.

In step 910, a data model layer configuration is generated in the data model layer and received at the PRS server 235. For example, the PRS server 235 can utilize an API of the cloud infrastructure system 220 to obtain data model attributes that are subject to security policies. The data model layer configuration may have the following format:

```
<EMP_OBJAttribute
    Name="Ename"
    AttrName="FName">
    <Properties>
        <CustomProperties>
            <Property
                Name="protectionState"
                Value="TOKENIZED"/>
            <Property
                Name="protectionKey"
                Value="EMP_OBJ/Fname_FLD"/>
        </CustomProperties>
    </Properties>
</EMP_OBJAttribute>
```

In step 920, one or more protected fields are determined. As discussed above with respect to providing a self-describing configuration, the administrator of PRS server 235 can request a list of data objects used by cloud-based application 245. The administrator can select which data objects (and/or their individual attributes) are subject to security policies and send that information to cloud-based application 245. Cloud based application 245 can then determine which fields are protected.

In step 930, operations than can be performed using protected fields are determined. This may include determining whether a protected field is searchable, used in an autocomplete, or the like. In step 940, the cloud-based application 245 is configured based on the determined operations that can be performed on protected fields. In one embodiment, the cloud-based application 245 can be configured when processing validators on protected data to only process a required check and skip any other validators. Cloud-based application 245 can be configured to add logic to control auto-suggest behavior on protected data. Cloud-based application 245 can be configured when rendering a query page to only allow exact match search operators. Cloud-based application 245 can be configured when rendering a table to disable sorting on columns from protected data objects.

VII. Federated Search

One operation that can be performed by cloud-based application 245 that may become invalid if it is operated against protected fields is search. When a certain field is protected, search becomes a challenge. Traditionally, either search functionality is compromised to only support exact match, or the PRS server 235 has to have a complete copy of every single searchable row with data replications setup between the cloud database 250 and private database 240. The PRS server 235 then needs to perform both searching on the sensitive data and rendering logic to render the final result.

In some embodiments, the one or more client devices 205, 210, and 215 can federate or centralize search results generated from searching the private database 240 and the cloud database 250. Rendering of a page associate with the cloud-based application 245 can be very complicated. For example, it can be a huge task for users to integrate the cloud-based application 245 with the PRS server 235 if the PRS server 235 has to render the cloud-based application 245. By using a client side federated search, the amount of integration work may be reduced, and the cloud-based application 245 can render the final result page completely so all pages will have the same look and feel, and be consistent. Thus, a federated search makes a search on protected and non-protected fields transparent to an end user. Additionally, there is no searchability compromise on the sensitive data.

In various embodiments, the one or more client devices 205, 210, and 215 split the original search into two searches. The one or more client devices 205, 210, and 215 split the original search based on a marked protected field map as in block 610 of FIG. 6, since each of the one or more client devices 205, 210, and 215 knows which fields are protected and which ones are not protected. A first search is performed against protected fields using the private database 240 (e.g., the search request payload has the information for PRS server 235 to perform a client side search only for the protected fields), and a second search is performed against all other fields including non-protected field using the cloud database 250 (e.g., the PRS server 235 may then modify the payload information so that the cloud-based application 245 knows the new search terms with protection tokens). The first search against the protected fields is performed using the PRS server 235 and the result sets will be passed to the cloud-based application 245 (in addition to the original search). The cloud-based application 245 can assemble the final result set from the first and second searches, and render federated search result pages.

For example, "Emp" object "firstName" attribute may be protected with protectKey EMP_OBJ/Ename_FLD, when a user does search "FirstName startwith 'B'", the original search request contains all the necessary information. The PRS server 235 intercepts the request, searches FirstName in the private database 240, updates the payload of the request with the tokenized values of all matched FirstNames, and passes on the request to cloud-based application 245. The cloud-based application 245 will then search the cloud database 250 with the tokenized values from the PRS server 235 and generates the final result dataset, which is used in final page rendering. The rendered page will be sent back to the one or more client devices 205, 210, and 215. The PRS server 235 intercepts the response and converts the tokenized values to real text before sending to the one or more client devices 205, 210, and 215. The searched results of protected fields from the PRS server 235 and the non-protected fields search results directly done in the cloud-based application 245 are combined in a final dataset.

In various embodiments, when a user initiates a search, if any of the search criteria is on protected fields, the PRS server 235 can apply the search against the private database 240. The PRS server 235 can generate a result sets as a set of qualified rows identified by row keys. The set of row keys are then sent to a search request for the cloud-based application 245. When cloud-based application 245 handles the search request, the qualified set of row keys will be used to filter out the final search result. For example, the row keys are used to identify the tokenized or encrypted data that match the search criteria and the tokenized or encrypted data are added to the search result obtained from running the search criteria against the non-protected data in the cloud database 250 The final search result will be rendered and sent back to the one or more client devices 205, 210, and 215 to display as a response to the original search request.

Figure 10:
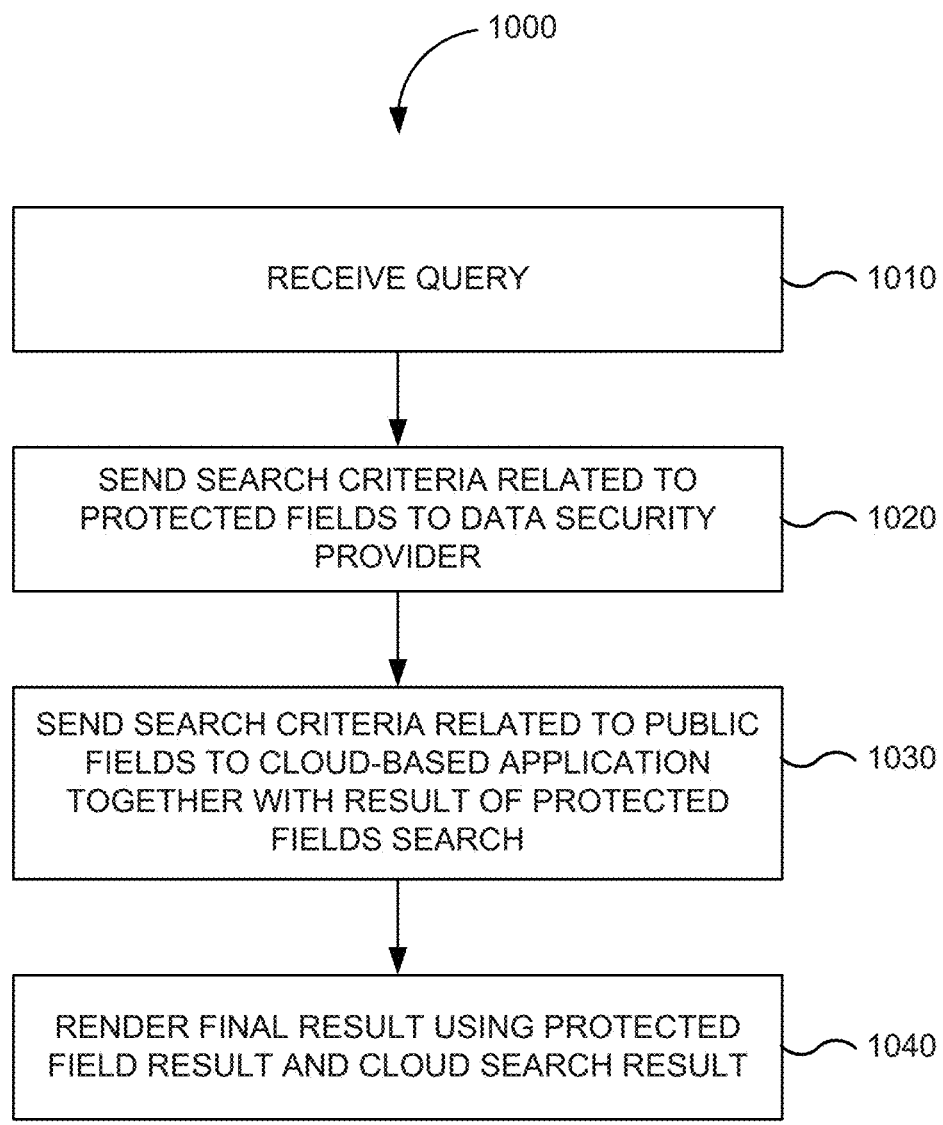
FIG. 10 is a flowchart of a method for federated search in one embodiment according to the present invention.

FIG. 10 is a flowchart of method 1000 for federated search in one embodiment according to the present invention. Implementations of or processing in method 1000 depicted in FIG. 10 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 1000 depicted in FIG. 10 begins in step 1010.

In step 1010, a query is received. For example, the one or more client devices 205, 210, and 215 can construct a query from information provided by a user and the cloud-based application 245 can receive the query from the one or more client devices 205, 210, and 215. The query can include search criteria applicable to protected and non-protected fields, e.g., a search of a person's first and last name where the first name is non-protected data but the last name is protected data. In step 1020, search criteria related to protected fields is sent to a data security provider such as the PRS server 235. In one embodiment, the one or more client devices 205, 210, and 215 send the entire query to PRS server 220 for processing on protected fields. PRS server 235 can then send the search results together with the original query to cloud-based application 230. For example, in step 1030, search criteria related to public fields is sent to a cloud-based application together with result of protected fields search. In some embodiments, the search criteria for each private database 225 and cloud database 235 can be sent independently.

In step 1040, any final results of the search are rendered using protected fields results and cloud search results. In one embodiment, when a user initiates a search, if any of the search criteria is on protected fields, PRS server 220 can apply the search against private database 225. PRS server can generate a result sets as a set of qualified rows identified by the row keys. The set of row keys are then sent to a search request for cloud-based application 230. When cloud-based application 230 handles the request, the qualified set of row keys will be used to filter out the final search result. Only the final search result will be rendered and sent back to client device 215 to display.

The final search result includes a combination of cloud data and tokenized/encrypted data that satisfied the search criteria against private database 240. The tokenized/encrypted data can be replaced with data from private database 240 before being displayed by the one or more client devices 205, 210, and 215. Accordingly, search results from both the private database 240 and the cloud-database 250 can be federated to provide a more seamless search experience to the user.

VIII. Hardware Environment

In the following description, for the purposes of explanation, specific details are set forth in order to provide a thorough understanding of embodiments of the invention. However, it will be apparent that various embodiments may be practiced without these specific details. The figures and description are not intended to be restrictive.

Systems depicted in some of the figures may be provided in various configurations. In some embodiments, the systems may be configured as a distributed system where one or more components of the system are distributed across one or more networks in a cloud computing system.

Figure 11:
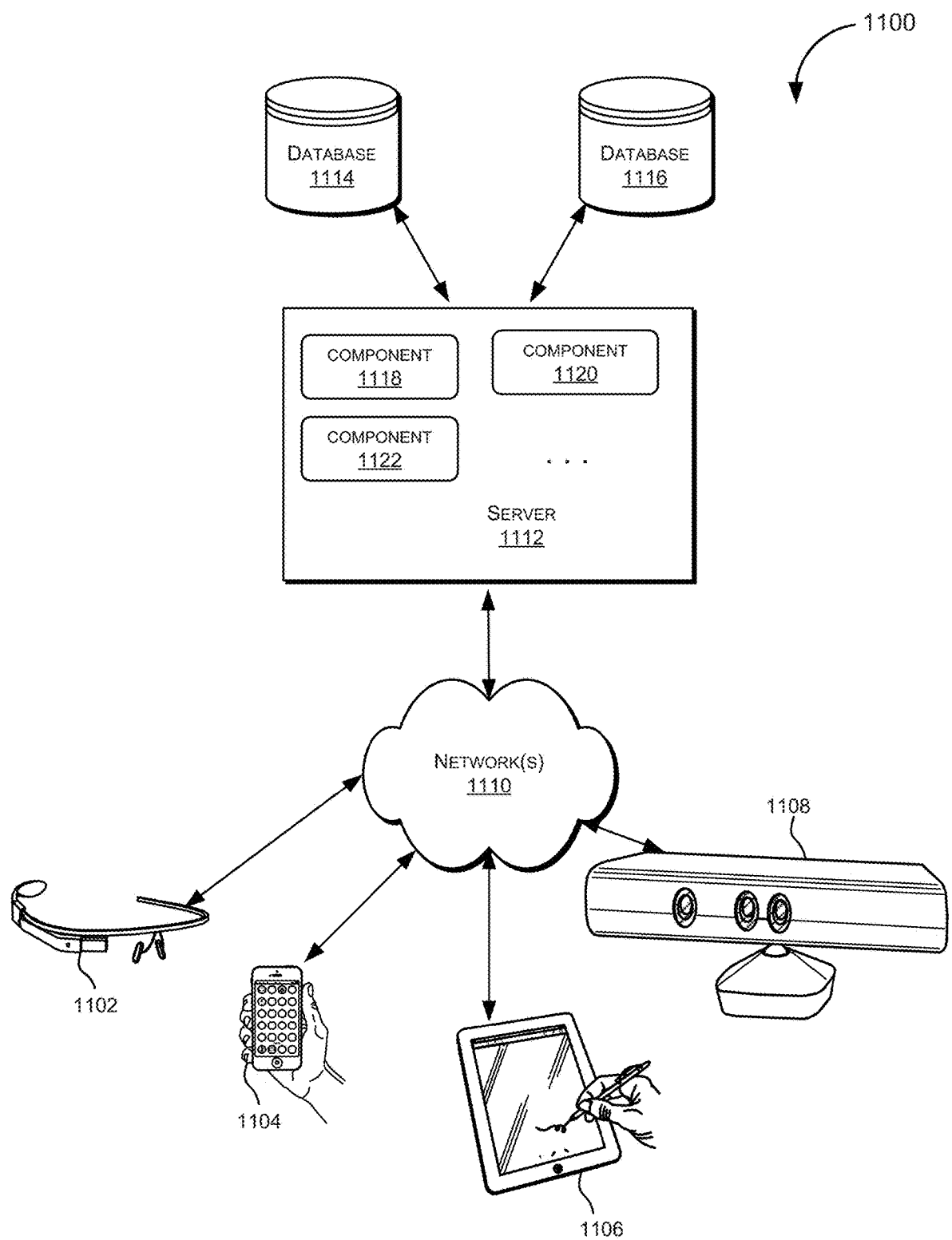
FIG. 11 depicts a simplified diagram of a distributed system for implementing one of the embodiments.

FIG. 11 depicts a simplified diagram of a distributed system 1100 for implementing one of the embodiments. In the illustrated embodiment, distributed system 1100 includes one or more client computing devices 1102, 1104, 1106, and 1108, which are configured to execute and operate a client application such as a web browser, proprietary client (e.g., Oracle Forms), or the like over one or more network(s) 1110. Server 1112 may be communicatively coupled with remote client computing devices 1102, 1104, 1106, and 1108 via network 1110.

In various embodiments, server 1112 may be adapted to run one or more services or software applications provided by one or more of the components of the system. In some embodiments, these services may be offered as web-based or cloud services or under a Software as a Service (SaaS) model to the users of client computing devices 1102, 1104, 1106, and/or 1108. Users operating client-computing devices 1102, 1104, 1106, and/or 1108 may in turn utilize one or more client applications to interact with server 1112 to utilize the services provided by these components.

In the configuration depicted in the figure, the software components 1118, 1120 and 1122 of system 1100 are shown as being implemented on server 1112. In other embodiments, one or more of the components of system 1100 and/or the services provided by these components may also be implemented by one or more of the client computing devices 1102, 1104, 1106, and/or 1108. Users operating the client computing devices may then utilize one or more client applications to use the services provided by these components. These components may be implemented in hardware, firmware, software, or combinations thereof. It should be appreciated that various different system configurations are possible, which may be different from distributed system 1100. The embodiment shown in the figure is thus one example of a distributed system for implementing an embodiment system and is not intended to be limiting.

Client computing devices 1102, 1104, 1106, and/or 1108 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general-purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1102, 1104, 1106, and 1108 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1110.

Although exemplary distributed system 1100 is shown with four client computing devices, any number of client computing devices may be supported. Other devices, such as devices with sensors, etc., may interact with server 1112.

Network(s) 1110 in distributed system 1100 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1110 can be a local area network (LAN), such as one based on Ethernet, Token-Ring and/or the like. Network(s) 1110 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1112 may be adapted to run one or more services or software applications described in the foregoing disclosure. For example, server 1112 may correspond to a server for performing processing described above according to an embodiment of the present disclosure.

Server 1112 may run an operating system including any of those discussed above, as well as any commercially available server operating system. Server 1112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1112 may include one or more applications to analyze and consolidate data feeds and/or event updates received from users of client computing devices 1102, 1104, 1106, and 1108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1112 may also include one or more applications to display the data feeds and/or real-time events via one or more display devices of client computing devices 1102, 1104, 1106, and 1108.

Distributed system 1100 may also include one or more databases 1114 and 1116. Databases 1114 and 1116 may reside in a variety of locations. By way of example, one or more of databases 1114 and 1116 may reside on a non-transitory storage medium local to (and/or resident in) server 1112. Alternatively, databases 1114 and 1116 may be remote from server 1112 and in communication with server 1112 via a network-based or dedicated connection. In one set of embodiments, databases 1114 and 1116 may reside in a storage-area network (SAN). Similarly, any necessary files for performing the functions attributed to server 1112 may be stored locally on server 1112 and/or remotely, as appropriate. In one set of embodiments, databases 1114 and 1116 may include relational databases, such as databases provided by Oracle, that are adapted to store, update, and retrieve data in response to SQL-formatted commands.

Figure 12:
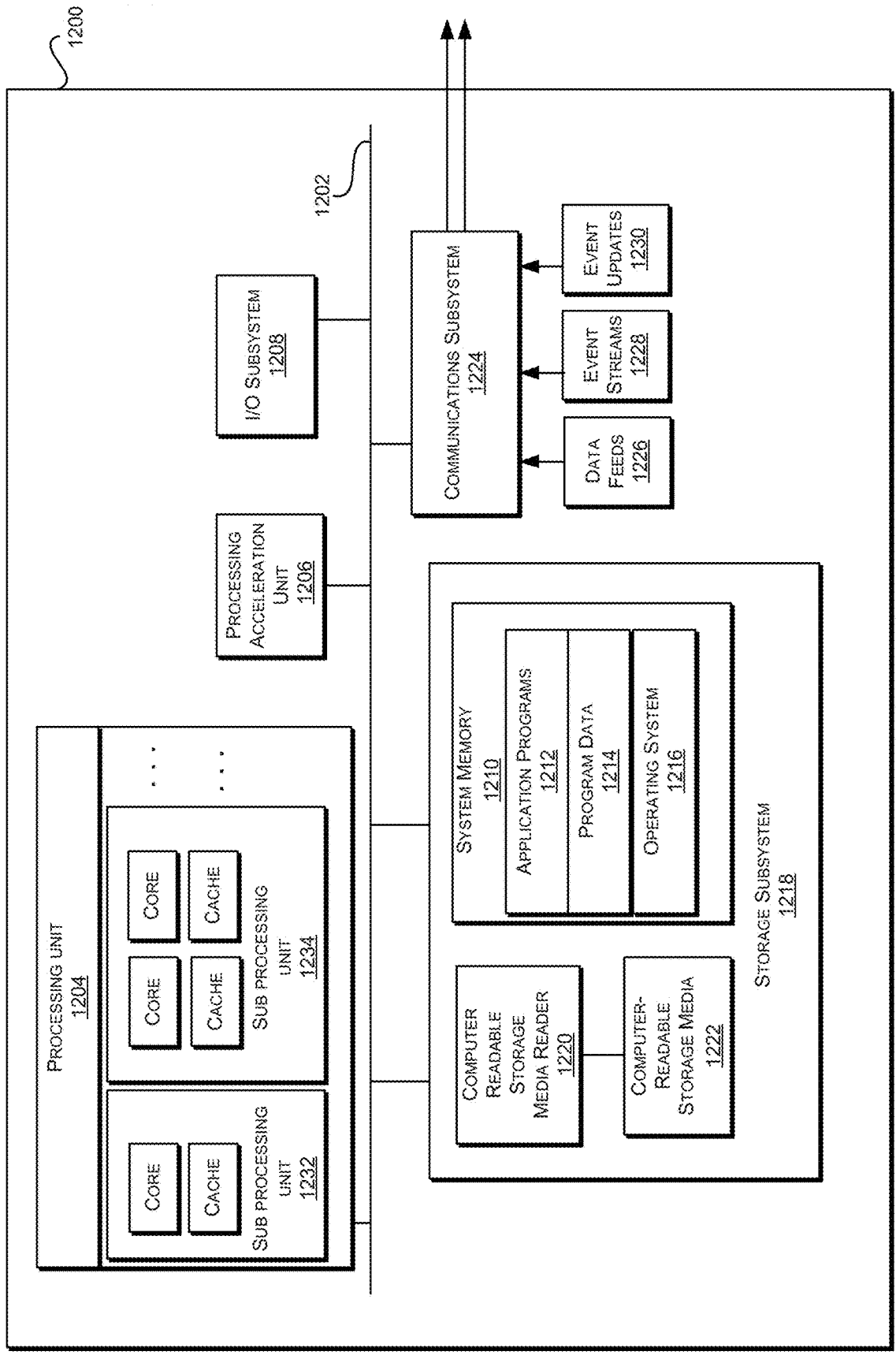
FIG. 12 illustrates an exemplary computer system, in which various embodiments of the present invention may be implemented.

FIG. 12 illustrates an exemplary computer system 1200, in which various embodiments of the present invention may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218, and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that comprises software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 12 OS, and Palm® OS operating systems.

Storage subsystem 1218 may also provide a tangible computer-readable storage medium for storing the basic programming and data constructs that provide the functionality of some embodiments. Software (programs, code modules, instructions) that when executed by a processor provide the functionality described above may be stored in storage subsystem 1218. These software modules or instructions may be executed by processing unit 1204. Storage subsystem 1218 may also provide a repository for storing data used in accordance with the present invention.

Storage subsystem 1200 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1200.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
   receiving, by a computing device, search criteria from a search initiated by a client device against data of a cloud-based application being used by a user of the client device, wherein the search criteria is split into a first portion and a second portion based on a marked protected field map that identifies fields of the data that are protected, the first portion of the search criteria is applicable to a first field of the data of the cloud-based application unprotected by a data security provider monitoring communications of the client device, and the second portion of the search criteria is applicable to a second field of the data of the cloud-based application identified by the marked protected field map as being protected by the data security provider;
   sending, by the computing device, the search criteria to the data security provider for processing the second portion of the search criteria on the second field to obtain first search results, wherein the first search results include tokens or encrypted data representing data of the cloud-based application within the second field that satisfies the second portion of the search criteria;
   receiving, by the computing device, the first search results from the data security provider;
   sending, by the computing device, the first search results and the search criteria to the cloud based application for processing the first portion of the search criteria on the first field to obtain second search results, wherein the second search results include a portion of the data of the cloud-based application within the first field that satisfies the first portion of the search criteria;
   receiving, by the computing device, the second search results from the cloud based application;
   rendering, by the computing device, the first search results and the second search results into a third search results; and
   communicating, by the computing device, the third search results to the client device.

2. The method of claim 1, wherein the receiving the first search results based on performing the second portion of the search criteria on the second field of the data of the cloud-based application protected by the data security provider comprises receiving information identifying replacement data used by the data security provider in the data of the cloud-based application.

3. The method of claim 1, wherein the receiving the first search results based on performing the second portion of the search criteria on the second field of the data of the cloud-based application protected by the data security provider comprises receiving a set of row keys identifying one or more rows in the data of the cloud-based application.

4. The method of claim 1, wherein the rendering the first search results and the second search results into the third search result comprises filtering the second search results using the first search results.

5. The method of claim 1, wherein the rendering the first search results and the second search results into the third search result comprises merging the second search results and the first search results.

6. The method of claim 1, wherein the communicating the third search results to the client device comprises communicating one or more tokens in the data of the cloud-based application representing data stored by the data security provider that satisfies the second portion of the search criteria.

7. The method of claim 1, wherein the communicating the third search results to the client device comprises communicating one or more encrypted data in the data of the cloud-based application representing data stored by the data security provider that satisfies the second portion of the search criteria.

8. A non-transitory machine readable storage medium having instructions stored thereon that when executed by one or more processors cause the one or more processors to perform a method comprising:
   receiving search criteria from a search initiated by a client device against data of a cloud-based application being used by a user of the client device, wherein the search criteria is split into a first portion and a second portion based on a marked protected field map that identifies fields of the data that are protected, the first portion of the search criteria is applicable to a first field of the data of the cloud-based application unprotected by a data security provider monitoring communications of the client device, and the second portion of the search criteria is applicable to a second field of the data of the cloud-based application identified by the marked protected field map as being protected by the data security provider;
   sending the search criteria to the data security provider for processing the second portion of the search criteria on the second field to obtain first search results, wherein the first search results include tokens or encrypted data representing data of the cloud-based application within the second field that satisfies the second portion of the search criteria;
   receiving the first search results from the data security provider;
   sending the first search results and the search criteria to the cloud based application for processing the first portion of the search criteria on the first field to obtain second search results, wherein the second search results include a portion of the data of the cloud-based application within the first field that satisfies the first portion of the search criteria;
   receiving the second search results from the cloud based application;
   rendering the first search results and the second search results into a third search result; and
   communicating the third search results to the client device.

9. The non-transitory machine readable storage medium of claim 8, the receiving the first search results based on performing the second portion of the search criteria on the second field of the data of the cloud-based application protected by the data security provider comprises receiving information identifying replacement data used by the data security provider in the data of the cloud-based application.

10. The non-transitory machine readable storage medium of claim 8, wherein the receiving the first search results based on performing the second portion of the search criteria on the second field of the data of the cloud-based application protected by the data security provider comprises receiving a set of row keys identifying one or more rows in the data of the cloud-based application.

11. The non-transitory machine readable storage medium of claim 8, wherein the rendering the first search results and the second search results into the third search result comprises filtering the second search results using the first search results.

12. The non-transitory machine readable storage medium of claim 8, wherein the rendering the first search results and the second search results into the third search result comprises merging the second search results and the first search results.

13. The non-transitory machine readable storage medium of claim 8, wherein the communicating the third search results to the client device comprises communicating one or more tokens in the data of the cloud-based application representing data stored by the data security provider that satisfies the second portion of the search criteria.

14. A system comprising:
a processor; and
a memory storing a set of instructions which when executed by the processor cause the processor to:
receive search criteria from a search initiated by a client device against data of a cloud-based application being used by a user of the client device, wherein the search criteria is split into a first portion and a second portion based on a marked protected field map that identifies fields of the data that are protected, the first portion of the search criteria is applicable to a first field of the data of the cloud-based application unprotected by a data security provider monitoring communications of the client device, and the second portion of the search criteria is applicable to a second field of the data of the cloud-based application identified by the marked protected field map as being protected by the data security provider;
send the search criteria to the data security provider for processing the second portion of the search criteria on the second field to obtain first search results, wherein the first search results include tokens or encrypted data representing data of the cloud-based application within the second field that satisfies the second portion of the search criteria;
receive the first search results from the data security provider;
send the first search results and the search criteria to the cloud based application for processing the first portion of the search criteria on the first field to obtain second search results, wherein the second search results include a portion of the data of the cloud-based application within the first field that satisfies the first portion of the search criteria;
receive the second search results from the cloud based application;
render the first search results and the second search results into a third search result; and
communicate the third search results to the client device.

15. The system of claim 14, wherein the receiving the first search results based on performing the second portion of the search criteria on the second field of the data of the cloud-based application protected by the data security provider comprises receiving information identifying replacement data used by the data security provider in the data of the cloud-based application.

16. The system of claim 14, wherein the receiving the first search results based on performing the second portion of the search criteria on the second field of the data of the cloud-based application protected by the data security provider comprises receiving a set of row keys identifying one or more rows in the data of the cloud-based application.

17. The system of claim 14, wherein the rendering the first search results and the second search results into the third search result comprises filtering the second search results using the first search results.

18. The system of claim 14, wherein the rendering the first search results and the second search results into the third search result comprises merging the second search results and the first search results.

19. The system of claim 14, wherein the communicating the third search results to the client device comprises communicating one or more tokens in the data of the cloud-based application representing data stored by the data security provider that satisfies the second portion of the search criteria.

20. The system of claim 14, wherein the communicating the third search results to the client device comprises communicating one or more encrypted data in the data of the cloud-based application representing data stored by the data security provider that satisfies the second portion of the search criteria.

* * * * *

UNITED STATES PATENT AND TRADEMARK OFFICE
CERTIFICATE OF CORRECTION

PATENT NO. : 10,586,061 B2  
APPLICATION NO. : 15/331626  
DATED : March 10, 2020  
INVENTOR(S) : Wu et al.

Page 1 of 2

It is certified that error appears in the above-identified patent and that said Letters Patent is hereby corrected as shown below:

In the Drawings

On sheet 9 of 13, in FIG. 8, under Reference Numeral 840, Line 1, delete "COMINGLING" and insert -- COMMINGLING --, therefor.

In the Specification

In Column 26, Line 38, delete "XML," and insert -- XML --, therefor.

In Column 26, Line 55, delete "protetionKey" and insert -- protectionKey --, therefor.

In Column 28, Line 43, delete "protecionKey." and insert -- protectionKey. --, therefor.

In Column 28, Line 46, delete "protecionKey." and insert -- protectionKey. --, therefor.

In Column 29, Line 25, delete "Cloud based" and insert -- Cloud-based --, therefor.

In Column 30, Line 36, delete "Cloud based" and insert -- Cloud-based --, therefor.

In the Claims

In Column 39, Line 42, in Claim 1, delete "cloud based" and insert -- cloud-based --, therefor.

In Column 39, Line 49, in Claim 1, delete "cloud based" and insert -- cloud-based --, therefor.

In Column 40, Line 49, in Claim 8, delete "cloud based" and insert -- cloud-based --, therefor.

In Column 40, Line 55, in Claim 8, delete "cloud based" and insert -- cloud-based --, therefor.

Signed and Sealed this  
Tenth Day of November, 2020

Andrei Iancu  
*Director of the United States Patent and Trademark Office*

CERTIFICATE OF CORRECTION (continued)
U.S. Pat. No. 10,586,061 B2

In Column 42, Line 4, in Claim 14, delete "cloud based" and insert -- cloud-based --, therefor.

In Column 42, Line 10, in Claim 14, delete "cloud based" and insert -- cloud-based --, therefor.